(12) United States Patent
Jeong et al.

(10) Patent No.: US 8,427,177 B2
(45) Date of Patent: Apr. 23, 2013

(54) CAPACITANCE SENSOR

(75) Inventors: Heewon Jeong, Tokyo (JP); Kiyoko Yamanaka, Tachikawa (JP); Yasushi Goto, Kokubunji (JP); Toshiaki Nakamura, Hitachinaka (JP); Masahide Hayashi, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 414 days.

(21) Appl. No.: 12/912,580

(22) Filed: Oct. 26, 2010

(65) Prior Publication Data

US 2011/0100126 A1 May 5, 2011

(30) Foreign Application Priority Data

Oct. 29, 2009 (JP) .................................. 2009-249424

(51) Int. Cl.
*G01R 27/26* (2006.01)
*G01R 27/08* (2006.01)

(52) U.S. Cl.
USPC .......................................... 324/658; 324/686

(58) Field of Classification Search .......................... None
See application file for complete search history.

(56) References Cited

U.S. PATENT DOCUMENTS

| 4,039,940 | A * | 8/1977 | Butler et al. .................... 324/678 |
| 8,154,310 | B1 * | 4/2012 | Maharyta et al. .............. 324/686 |
| 2007/0103171 | A1 * | 5/2007 | Kitaoka ......................... 324/662 |
| 2009/0013784 | A1 | 1/2009 | Ohkoshi |
| 2009/0021267 | A1 * | 1/2009 | Golovchenko et al. ........ 324/686 |
| 2012/0256647 | A1 * | 10/2012 | Tao et al. ....................... 324/686 |

FOREIGN PATENT DOCUMENTS

| JP | 5-281256 A | 10/1993 |
| JP | 2007-248328 A | 9/2007 |

* cited by examiner

*Primary Examiner* — Jermele M Hollington
(74) *Attorney, Agent, or Firm* — Crowell & Moring LLP

(57) ABSTRACT

A technique in which a false detection and a wrong diagnosis can be suppressed in a capacitance sensor represented by an acceleration sensor is provided. A first capacitative element and a second capacitative element, which configure a capacitance detection unit, and a third capacitative element and a fourth capacitative element, which configure a forced oscillation generation unit, are electrically separated from each other. That is, the diagnosis movable electrode that configures the third capacitative element and the fourth capacitative element is formed integrally with the movable part. On the other hand, the diagnosis fixed electrode and the diagnosis fixed electrode are electrically separated from the detection fixed electrode and the detection fixed electrode.

21 Claims, 12 Drawing Sheets

CAPACITANCE SENSOR

CLAIM OF PRIORITY

The present application claims priority from Japanese patent application JP 2009-249424 filed on Oct. 29, 2009, the content of which is hereby incorporated by reference into this application.

FIELD OF THE INVENTION

The present invention relates to a capacitance sensor, and more particularly to a technique that is effectively applied to a capacitance sensor having a diagnosis function for determining whether a failure (abnormality) occurs, or not.

BACKGROUND OF THE INVENTION

An acceleration sensor which is one of MEMS (micro electro mechanical systems) sensors is made up of a weight (movable part) and a support beam (elastic deformation part), and converts acceleration exerted on the weight into an electric signal. The MEMS sensors of this type include a capacitance sensor that detects the acceleration as a capacitance change between electrodes configuring a capacitor. The capacitance sensor captures the acceleration exerted on the weight as a change in the capacity or the like, and converts the acceleration into an electric signal through an LSI circuit as an output of the MEMS sensor.

For example, in an attitude control system that suppresses the sideslip and spin of a vehicle to assist safe travel, the MEMS sensors such as an angular velocity sensor for detecting an angular velocity, and an acceleration sensor for detecting accelerations in a longitudinal direction and a lateral direction are used as key devices. In the attitude control system, an output of an engine and a braking force of a brake are controlled on the basis of the outputs from the angular velocity sensor and the acceleration sensor to suppress the sideslip and spin of the vehicle. From this viewpoint, there is a high possibility that a failure of the angular velocity sensor or the acceleration sensor leads to an accident, and when the angular velocity sensor or the acceleration sensor fails, this fact needs to be immediately announced.

JP-A-2007-248328 discloses an acceleration sensor including: a detection element having two movable electrodes that are movable due to acceleration and two detection electrodes which are disposed to face those respective movable electrodes; a drive circuit that inputs an AC bias voltage signal to the movable electrodes; and a detection circuit that outputs an acceleration signal on the basis of two detection signals output from the two detection electrodes. In the detection circuit of this acceleration sensor, there is provided failure detecting means that, apart from a reference voltage signal that is inputted to two amplifiers, a detection voltage signal is inputted to those two amplifiers from a detection voltage supply part to detect a failure on the basis of a detection differential signal output from a differential detector.

JP-A-Hei05 (1993)-281256 discloses that a diagnosis signal having a low frequency is superimposed on an AC signal supplied for the purpose of detecting a capacitance of the detection electrodes to change the capacitances between the movable electrodes and the fixed electrodes. JP-A-Hei05 (1993)-281256 also discloses that whether the output resultantly generated from the acceleration sensor oscillates, or not, can be observed to determine whether there is a failure in the acceleration sensor, or not, while detecting the acceleration which is a signal.

JP-A-Hei05 (1993)-281256 further discloses that because the diagnosis signal having the lower frequency allows the output to oscillate with the amplitude of the degree that does not affect the measurement of acceleration, constant diagnosis for diagnosing the presence/absence of the failure while detecting the acceleration is enabled. JP-A-Hei05(1993)-28125 further discloses when the diagnosis signal (changeover signal of the diagnosis types) is a low level, high acceleration diagnosis that allows the movable electrodes to largely forcedly oscillate is also enabled.

SUMMARY OF THE INVENTION

As described above, it is desirable that the failure can be detected immediately when a capacitance sensor represented by the acceleration sensor fails. Accordingly, it is desirable that the presence/absence of the failure can be diagnosed while operating the capacitance sensor from the viewpoint of detecting the failure immediately.

Even in the conventional acceleration sensors having the diagnosis function for diagnosing the presence/absence of the failure, for example, a technique disclosed in the above-mentioned JP-A-2007-248328 must conduct the operation of measuring the acceleration and the operation of diagnosing the failure, separately, and cannot realize such a constant diagnosis that the presence/absence of the failure is diagnosed while detecting the acceleration. That is, in the technique disclosed in JP-A-2007-248328, even if the failure occurs during the operation of the acceleration sensor, the failure cannot be detected immediately.

On the other hand, according to a technique disclosed in the above-mentioned JP-A-Hei05 (1993)-281256, the diagnosis signal having the low frequency is superimposed on the AC signal which is supplied for the purpose of detecting the capacitance of the detection electrodes, whereby the presence/absence of the failure of the acceleration sensor can be determined while detecting the acceleration.

However, when the diagnosis signal is superimposed directly on the detection electrodes for detecting the acceleration, per se, the diagnosis signal affects a charge quantity which is inputted to a capacitance/voltage conversion unit for converting a capacitance change of the detection electrodes into a voltage signal. For that reason, such an offset drift that a zero point of the output of the acceleration sensor is varied occurs. When the offset drift occurs, the acceleration sensor acts as if acceleration is applied to the acceleration sensor although the acceleration is not applied thereto. This indicates that the acceleration sensor conducts false detection.

Also, the above-mentioned problem about the zero-point offset arises in not only the constant diagnosis in which the presence/absence of failure is diagnosed while detecting the acceleration, but also an initial diagnosis which is conducted before the acceleration sensor operates. For example, when the acceleration sensor is put on an inclined location, although the acceleration is not applied to the acceleration sensor, the movable part is displaced from the zero point due to the gravity acceleration to cause the zero-point offset. In this case, there is a risk that a wrong diagnosis that the acceleration sensor fails is conducted although the acceleration sensor is normal.

An object of the present invention is to provide a technique by which the false detection and the wrong diagnosis can be suppressed in a capacitance sensor represented by the acceleration sensor.

The above and other objects, and novel features of the present invention will become apparent from the description of the present specification and the accompanying drawings.

The outlines of typical aspects among various aspects of the present invention disclosed in the present application will be described in brief below.

According to one typical aspect of the present invention, there is provided a capacitance sensor comprising: (a) a substrate; (b) a cavity part that is formed in the substrate; (c) a fixed part that is formed within the cavity part; (d) an elastic deformation part that is formed within the cavity part and connected to the fixed part; and (e) a movable part that is formed within the cavity part, and connected to the elastic deformation part. The capacitance sensor also comprises: (f) a capacitance detection unit that includes a first capacitative element having a first fixed electrode formed within the cavity part, and a first movable electrode formed in the movable part so as to face each other, and outputs a capacitance change of the first capacitative element, which is developed by displacing the movable part; and (g) a physical quantity calculation terminal that is connected to a physical quantity calculation section which finds a physical quantity of an external force on the basis of the capacitance change which is outputted from the capacitance detection unit. The capacitance sensor further comprises: (h) a forced oscillation generation unit that includes a second capacitative element having a second fixed electrode formed within the cavity part, and a second movable electrode formed in the movable part so as to face each other, and a diagnostic signal supply terminal for supplying a diagnostic signal between the second fixed electrode and the second movable electrode, and supplies the diagnostic signal to the diagnostic signal supply terminal to develop an electrostatic force between the second fixed electrode and the second movable electrode for generating forced oscillation. The capacitance sensor further comprises: (i) the physical quantity calculation terminal that is connected indirectly to an abnormality determination unit that determines whether there is an abnormality in the capacitance sensor, or not, on the basis of the forced oscillation generated in the forced oscillation generation unit. In the capacitance sensor, the first capacitative element included in the capacitance detection unit and the second capacitative element included in the forced oscillation generation unit are separated from each other.

According to another typical aspect of the present invention, there is provided a capacitance sensor comprising: (a) a substrate; (b) a cavity part that is formed in the substrate; (c) a fixed part that is formed within the cavity part; (d) an elastic deformation part that is formed within the cavity part and connected to the fixed part; and (e) a movable part that is formed within the cavity part, and connected to the elastic deformation part. The capacitance sensor also comprises: (f) a capacitance detection unit that includes a first capacitative element having a first fixed electrode formed within the cavity part, and a first movable electrode formed in the movable part so as to face each other, and outputs a capacitance change of the first capacitative element, which is developed by displacing the movable part. The capacitance sensor further comprises: (g) a physical quantity calculation terminal that is connected to a physical quantity calculation section which finds a physical quantity of an external force on the basis of the capacitance change which is outputted from the capacitance detection unit. The capacitance sensor further comprises: (h) a forced displacement generation unit that includes a second capacitative element having a second fixed electrode formed within the cavity part, and a second movable electrode formed in the movable part so as to face each other, a first diagnostic signal supply terminal for supplying a first diagnostic signal between the second fixed electrode and the second movable electrode, and a second diagnostic signal supply terminal for supplying a second diagnostic signal between the second fixed electrode and the second movable electrode, and when operation starts, supplies the first diagnostic signal to the first diagnostic signal supply terminal to displace the movable part in a first direction, and supplies the second diagnostic signal to the second diagnostic signal supply terminal to displace the movable part in a second direction opposite to the first direction. The capacitance sensor further comprises: (i) the physical quantity calculation terminal that is connected indirectly to an abnormality determination unit that determines whether there is an abnormality in the capacitance sensor, or not, on the basis of the forced displacement generated in the forced displacement generation unit. In the capacitance sensor, the first capacitative element included in the capacitance detection unit and the second capacitative element included in the forced displacement generation unit are separated from each other.

The advantage obtained by the typical aspects among the various aspects of the present invention disclosed in the present application is described in brief below.

In the capacitance sensor represented by the acceleration sensor, the false detection and the wrong diagnosis can be suppressed.

DETAILED DESCRIPTION OF THE PREFERRED EMBODIMENTS

Figure 1:
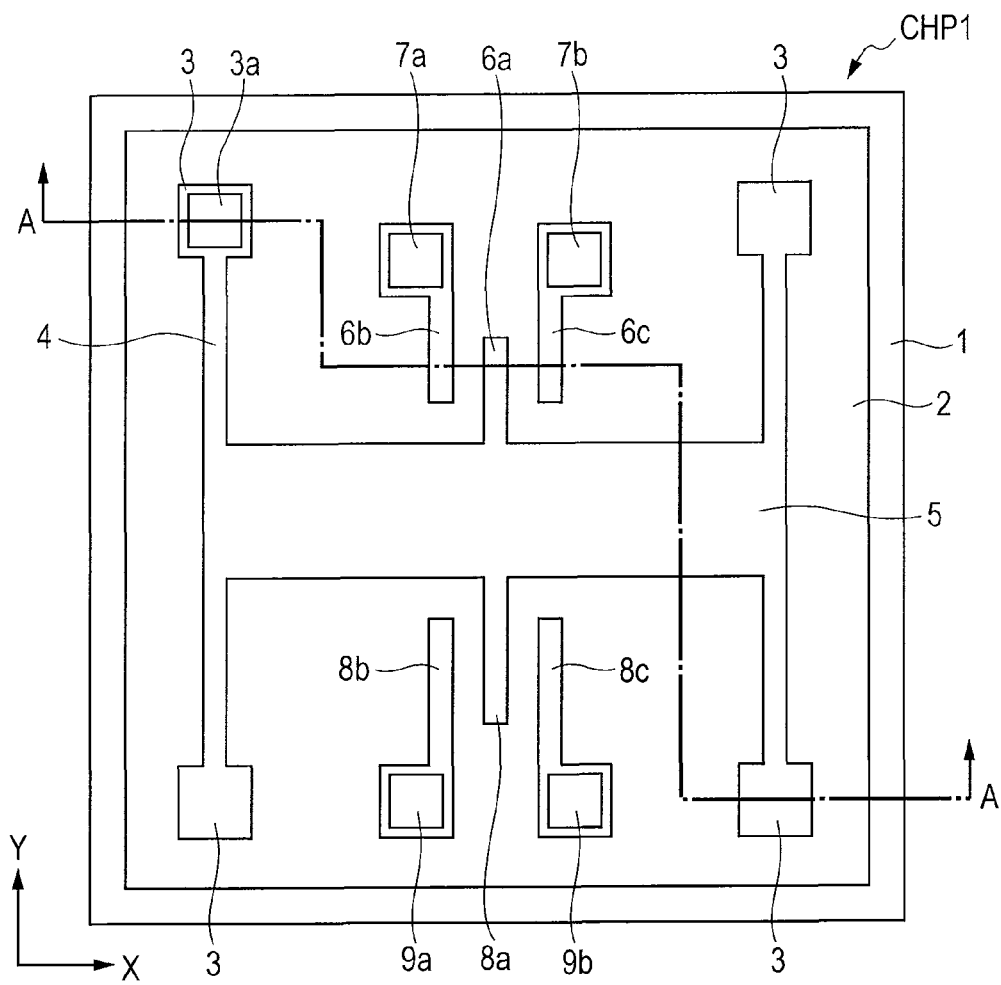
FIG. 1 is a plan view illustrating an MEMS structure configuring an acceleration sensor according to the present invention.

As occasion demands for convenience, the following embodiments are divided into plural sections or embodiments for description, but unless particularly clearly specified, those sections or embodiments are not irrelevant to each other, and one section or embodiment is relevant to modified examples, details, and supplemental description of a part or all of the others.

Also, in the following embodiments, when the number of elements (including the number, numerical value, quantity, and range) is referred to, the present invention is not limited to the specific value, and may be equal to, larger or smaller than the specific value if not particularly clearly specified, or if clearly limited to the specific value in principle.

Further, it is unnecessary to say that, in the following embodiments, the components (including the elemental steps) are not always essential unless particularly clearly specified and conceivably clearly essential in principle.

Likewise, in the following embodiments, when the shape and positional relationship of the components are referred to, the shape and so on include a shape substantially approximate or similar to that shape, and so on if not particularly clearly specified, or unless it is clearly conceivable that this is not the case in principle. The same is applied to the above numerical value and range.

Also, in all of the drawings for describing the embodiments, identical members are denoted by the same symbols in principle, and their repetitive description is omitted. For facilitation of understanding the drawing, plan views may be also hatched.

First Embodiment

A MEMS sensor (capacitance sensor) according to a first embodiment will be described with reference to the accompanying drawings. In the first embodiment, an acceleration sensor will be described as one example of the MEMS sensor. FIG. 1 is a plan view illustrating a structure configuring the acceleration sensor formed on a semiconductor chip CHP1. As illustrated in FIG. 1, a frame part 1 is formed in the semiconductor chip CHP1, and a cavity part 2 is formed to be surrounded by the frame part 1. Fixed parts 3 are disposed inside the cavity part 2, and beams (elastic deformation parts) 4 are connected to the corresponding fixed parts 3. The beams 4 are connected with a movable part 5 which forms a weight of the acceleration sensor. That is, the fixed parts 3 and the movable part 5 are connected by the elastically deformable beams 4, and the movable part 5 can be displaced in an X-direction of FIG. 1.

The movable part 5 is formed with a detection movable electrode 6a formed integrally with the movable part 5. A detection fixed electrode 6b and a detection fixed electrode 6c are so formed as to face the detection movable electrode 6a. Each pair of the detection movable electrode 6a and the detection fixed electrode 6b, and the detection movable electrode 6a and the detection fixed electrode 6c forms a capacitative electrode. When the movable part 5 is displaced in the X-direction by acceleration applied from the external, each capacitance of the above-mentioned capacitative elements changes. That is, each capacitative element made up of the detection movable electrode 6a and the detection fixed electrode 6b, or the detection movable electrode 6a and the detection fixed electrode 6c functions as a capacitance detection unit for detecting the displacement of the movable part 5 in the X-direction as a capacitance change.

The movable part 5 is also formed with a diagnosis movable electrode 8a formed integrally with the movable part 5. A diagnosis fixed electrode 8b and a diagnosis fixed electrode 8c are so formed as to face the diagnosis movable electrode 8a. Each pair of the diagnosis movable electrode 8a and the diagnosis fixed electrode 8b, and the diagnosis movable electrode 8a and the diagnosis fixed electrode 8c forms a capacitative electrode. When a periodic diagnosis signal is supplied between the diagnosis movable electrode 8a and the diagnosis fixed electrode 8b, and the diagnosis movable electrode 8a and the diagnosis fixed electrode 8c, which form the respective capacitative elements, respective electrostatic forces are exerted between the diagnosis movable electrode 8a and the diagnosis fixed electrode 8b, and between the diagnosis movable electrode 8a and the diagnosis fixed electrode 8c, to oscillate the diagnosis movable electrode 8a. When the diagnosis movable electrode 8a oscillates in the X-direction, the movable part 5 formed integrally with the diagnosis movable electrode 8a also oscillates. That is, each capacitative element made up of the diagnosis movable electrode 8a and the diagnosis fixed electrode 8b, or the diagnosis movable electrode 8a and the diagnosis fixed electrode 8c functions as a forced oscillation generation unit for forcedly oscillating the movable part 5 in the X-direction.

The structure of the acceleration sensor configured as described above is made of a semiconductor material such as silicon. Accordingly, the fixed parts 3 and the movable part 5 which are connected to each other through the beams 4 are electrically connected. A potential that is applied to the movable part 5 is supplied from a pad 3a formed in each of the fixed parts 3. On the other hand, a pad 7a and a pad 7b are formed in the detection fixed electrode 6b and the detection fixed electrode 6c, respectively, so that electric discharges can flow into or out of the detection fixed electrode 6b and the detection fixed electrode 6c due to the capacitance change developed by displacing the movable part 5 in the X-direction. Also, a pad 9a and a pad 9b are formed in the diagnosis fixed electrode 8b and the diagnosis fixed electrode 8c, respectively, so that a diagnosis signal can be supplied from the pad 9a and the pad 9b to the diagnosis fixed electrode 8b and the diagnosis fixed electrode 8c.

Figure 2:
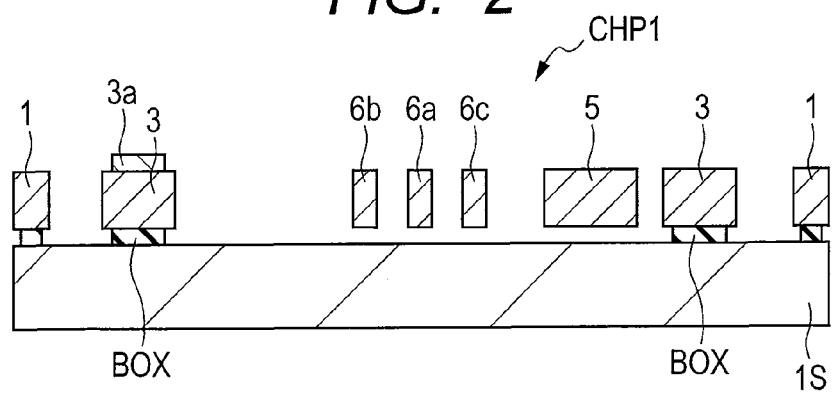
FIG. 2 is a cross-sectional view taken along a line A-A of FIG. 1.

FIG. 2 is a cross-sectional view taken along a line A-A of FIG. 1. As illustrated in FIG. 2, the semiconductor chip CHP1 has an embedded insulating layer BOX formed on a substrate layer 1S, and a silicon layer formed on the embedded insulating layer BOX. That is, in the first embodiment, the semiconductor chip CHP1 configuring the acceleration sensor is made up of an SOI (silicon on insulator) substrate having the substrate layer 1S, the embedded insulating layer BOX, and the silicon layer. The frame part 1, the fixed parts 3, the movable part 5, the detection movable electrode 6a, the detection fixed electrode 6b, and the detection fixed electrode 6c, which are illustrated in FIG. 2, and the beams 4, the diagnosis movable electrode 8a, the diagnosis fixed electrode 8b, and the diagnosis fixed electrode 8c, which are not illustrated in FIG. 2 are formed by processing a silicon layer of the SOI substrate. For example, in FIG. 2, it is found that the frame part 1 and the fixed parts 3 are fixedly formed on the embedded insulating layer BOX. On the other hand, for example, the movable part 5 is also formed of the silicon layer, but the embedded insulating layer BOX formed in a lower layer of the movable part 5 is removed. Likewise, the embedded insulating layer BOX formed in a lower layer of the beams 4 not illustrated in FIG. 2 is also removed. Accordingly, the movable part 5 is arranged within the cavity part, and also supported by the beams 4. From this fact, the movable part 5 is formed to be displaceable.

It is assumed that the acceleration sensor according to the first embodiment is formed by processing the SOI substrate through the photolithography technique and a DRIE (deep reactive ion etching). In the first embodiment, an example in which the acceleration sensor is manufactured by using the SOI substrate is merely described. The concept in the first embodiment can be also applied to a case in which both of a front surface and a rear surface of the silicon substrate are processed by using a joint technique of glass-silicon-glass, or the like to form the acceleration sensor (MEMS structure)

(bulk MEMS process). Further, the concept in the first embodiment can be also applied to a case in which a thin film is deposited on the surface of the silicon substrate on which a signal processing circuit such as a transistor has been formed in advance, and the deposited thin film is repetitively patterned to form the acceleration sensor (MEMS structure) (surface MEMS process).

The semiconductor chip CHP1 on which the acceleration sensor (MEMS structure) is formed according to the first embodiment is configured as described above, and a configuration example in which the semiconductor chip CHP1 is mounted will be described below. In the first embodiment, an example in which the acceleration sensor (MEMS structure) and an LSI that processes an output signal from the acceleration sensor are formed on different semiconductor chips will be described. However, the present invention is not limited to this configuration, but can be also applied to a case in which the MEMS structure that configures the acceleration sensor and the transistor that configures the signal processing circuit are formed on the same semiconductor chip.

Figure 3:
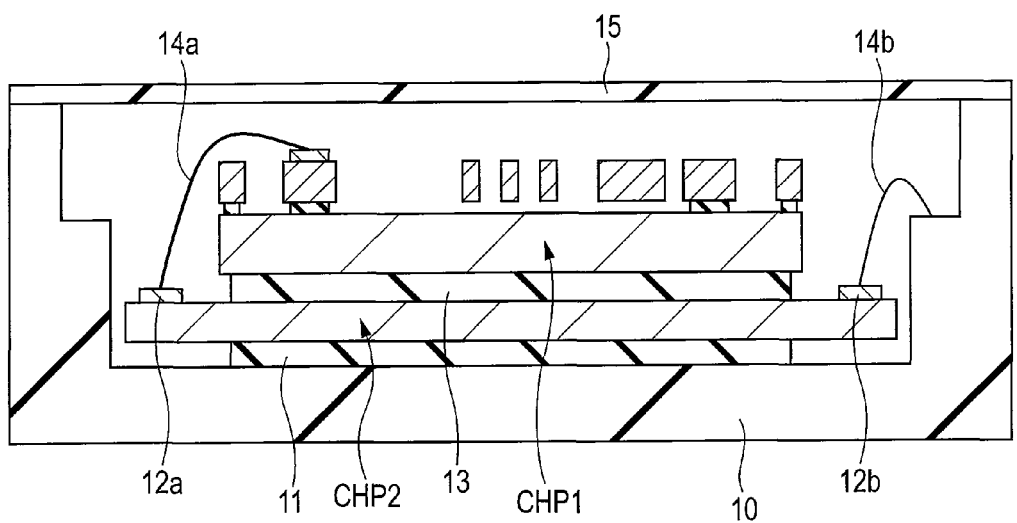
FIG. 3 is a cross-sectional view illustrating a configuration example in which the acceleration sensor is mounted.

FIG. 3 is a cross-sectional view illustrating a configuration example in which the acceleration sensor is mounted according to the first embodiment. As illustrated in FIG. 3, a semiconductor chip CHP2 is mounted on a bottom of an outer frame body 10 having a recess through an adhesive 11. The outer frame body 10 is made of, for example, ceramic. On the semiconductor chip CHP2 is formed an integrated circuit having a transistor, a passive element, and so on through a normal semiconductor manufacturing technique. The integrated circuit formed on the semiconductor chip CHP2 has a function of processing an output signal from the acceleration sensor (MEMS structure), and finally outputs an acceleration signal.

The semiconductor chip CHP1 is mounted on the semiconductor chip CHP2 through the adhesive 13. The semiconductor chip CHP1 is a semiconductor chip on which the MEMS structure configuring the acceleration sensor described with reference to FIGS. 1 and 2 is formed. A pad formed on the semiconductor chip CHP1 and a pad 12a formed on the semiconductor chip CHP2 are connected to each other by, for example, a wire 14a. Further, a pad 12b formed on the semiconductor chip CHP2 is connected to a terminal formed on the outer frame body 10 by a wire 14b.

The semiconductor chip CHP1 and the semiconductor chip CHP2 which have been laminated on each other and disposed within the outer frame body 10 are sealed by sealing an upper portion of the outer frame body 10 with a lid 15. In this manner, the acceleration sensor according to the first embodiment is mounted. According to the acceleration sensor illustrated in FIG. 3, a signal detected by the semiconductor chip CHP1 can be input to the semiconductor chip CHP2. Thereafter, the signal input to the semiconductor chip CHP2 is processed by the integrated circuit formed in the semiconductor chip CHP2, and an acceleration signal corresponding to the acceleration is finally output from the semiconductor chip CHP2. The acceleration signal output from the semiconductor chip CHP2 is outputted to the outer frame body 10 through the wire 14b so as to be extracted from the external. In the first embodiment, a ceramic package using the outer frame body 10 is described. However, the present invention is not limited to this configuration, and can be also applied to, for example, a packaging configuration made by a wafer level package using glass anodic bonding.

Subsequently, a basic operating principle of the acceleration sensor according to the first embodiment will be described. As illustrated in FIG. 1, the acceleration sensor according to the first embodiment has the movable part 5 that can be displaced in the X-direction. For example, the movable part 5 is displaced in the X-direction when the acceleration is applied in the X-direction. The detection movable electrode 6a is formed in the movable part 5, and the detection fixed electrode 6b and the detection fixed electrode 6c are so formed as to face the detection movable electrode 6a. In this case, when the movable part 5 is displaced, the detection movable electrode 6a is displaced with the displacement thereof. On the other hand, the detection fixed electrode 6b and the detection fixed electrode 6c are fixed and not displaced. Accordingly, when the movable part 5 is displaced by applying the acceleration in the X-direction, an interelectrode distance of each capacitative element made up of the detection movable electrode 6a and the detection fixed electrode 6b, or the detection movable electrode 6a and the detection fixed electrode 6c is changed. The change in the interelectrode distance of the capacitative element means a change in the electric capacitance (capacitance) of the capacitative element. When the acceleration is thus applied in the X-direction, the movable part 5 is displaced in the X-direction with the result that the capacitance of the capacitative element is changed. The capacitance change is transformed into a voltage signal by a voltage transforming unit, and the acceleration signal is outputted from the acceleration sensor on the basis of a transformed electric signal. From this fact, it is found that the acceleration applied to the acceleration sensor is detected as the capacitance change of the capacitative element, and the detected capacitance change is transformed into the voltage signal, and the acceleration signal is finally output from the acceleration sensor.

The basic operating principle of the acceleration sensor is described above. However, the actual operation of the acceleration sensor is more complicated for the purpose of realizing the high sensitivity. The reason will be described below. For example, the acceleration that is applied to the acceleration sensor is a signal having a low frequency such as DC to several tens Hz. Accordingly, in the operation of the above-mentioned basic principle, the capacitance change of the capacitative element is also changed at DC to several tens Hz in correspondence with the acceleration of the low frequency, and the voltage signal into which the capacitance change has been transformed becomes also a signal of DC to several tens Hz. In this case, the voltage signal of the low frequency is liable to be affected by a DC-like noise generated in an analog circuit, in particular, a 1/f noise. The 1/f noise is a noise inversely proportional to the frequency, and becomes larger as the frequency of the signal is lower, and smaller as the frequency of the signal is higher. Accordingly, because the voltage signal into which the capacitance change has been transformed is a signal of the low frequency such as DC to several tens Hz, the 1/f noise becomes also larger. This means that the noise of the signal becomes larger, that is, the S/N ratio becomes smaller. That the S/N ratio becomes smaller means that a weak signal cannot be detected, and the detection precision is deteriorated.

Under the circumstances, in the acceleration sensor, the signal of DC to several tens Hz is transformed into a signal of a high frequency small in the 1/f noise. More specifically, the movable part 5 of the acceleration sensor is oscillated with the use of a carrier wave of several hundreds kHz. As a result, the capacitance change of DC to several tens Hz is transformed into a high frequency signal having the same frequency as that of the carrier wave. In a high frequency band where the high frequency signal exists, the 1/f noise is smaller than that in the low frequency band of DC to several tens Hz. For that reason, the weak capacitance change of DC to several tens Hz is transformed into a high frequency signal small in the 1/f noise by the carrier wave, thereby enabling even the weak capacitance change to be detected with a high precision. That is, the movable part 5 is oscillated with the carrier wave of several hundreds kHz so that the capacitance change of DC to several tens Hz due to the acceleration is superimposed on the high frequency signal to subject the high frequency signal to signal processing. As a result, the effect of the 1/f noise can be suppressed to improve the S/N ratio, and the detection precision of the acceleration signal can be improved.

As described above, in the actual acceleration sensor, the movable part 5 is oscillated with the carrier wave of several hundreds kHz. Hereinafter, the actual configuration of the acceleration sensor will be described, and thereafter the operation thereof will be described.

Figure 4:
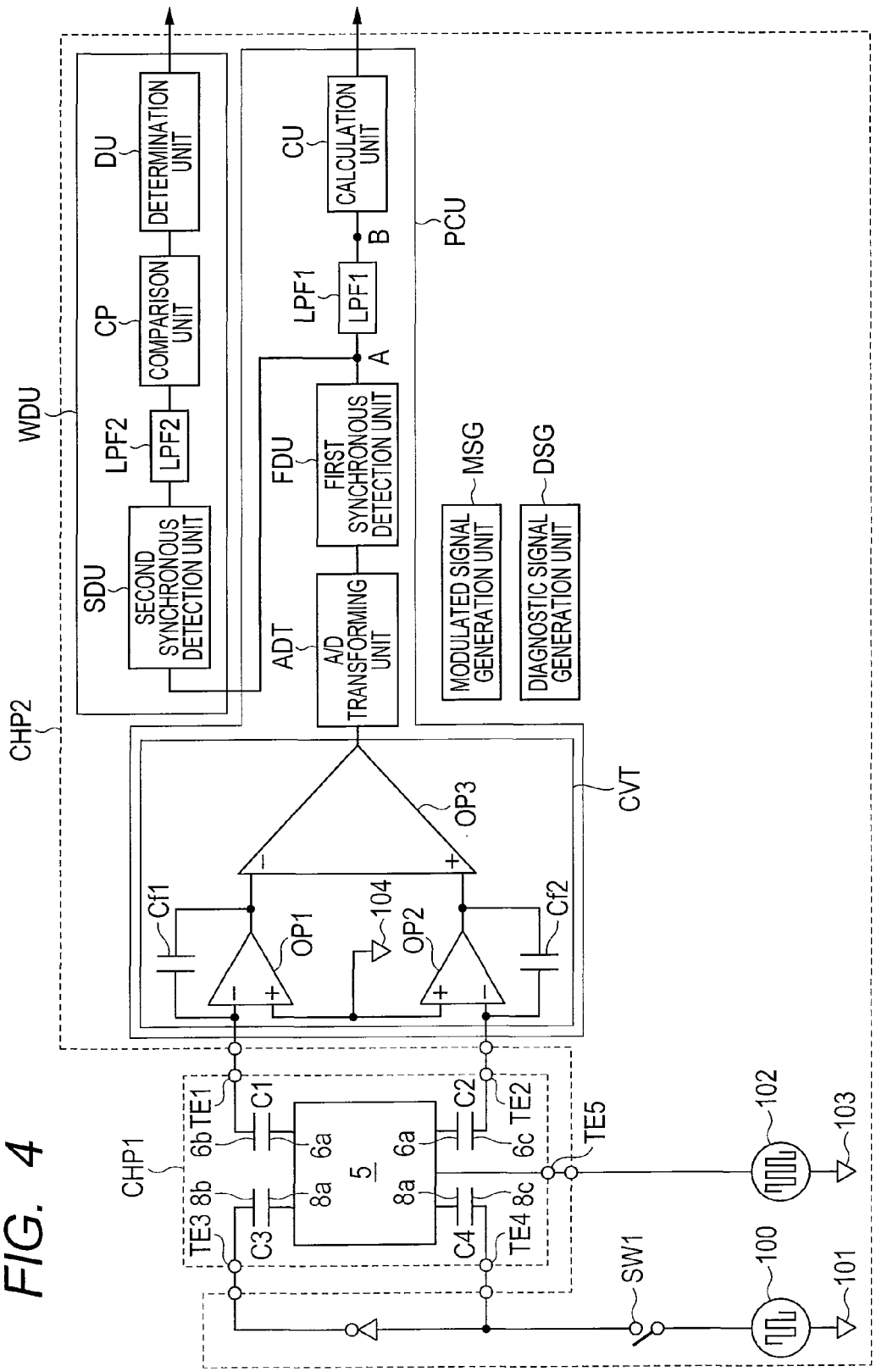
FIG. 4 is a diagram illustrating the configuration of an acceleration sensor according to a first embodiment.

FIG. 4 is a diagram illustrating the configuration of the acceleration sensor according to the first embodiment of the present invention. As illustrated in FIG. 4, the acceleration sensor according to the first embodiment has the semiconductor chip CHP1 and the semiconductor chip CHP2, and the MEMS structure is formed in the semiconductor chip CHP1, and the signal processing circuit is formed in the semiconductor chip CHP2.

First, FIG. 4 illustrates the movable part 5 of the MEMS structure formed in the semiconductor chip CHP1, and a capacitive element C1 which is a capacitance detection unit is formed between the movable part 5 and a physical quantity calculation terminal TE1. The capacitive element C1 is made up of the detection movable electrode 6a and the detection fixed electrode 6b. Also, a capacitive element C2 is formed between the movable part 5 and a physical quantity calculation terminal TE2. The capacitive element C2 is made up of the detection movable electrode 6a and the detection fixed electrode 6c.

Subsequently, the configuration of the signal processing circuit formed in the semiconductor chip CHP2 will be described. Referring to FIG. 4, a modulated signal generation unit MGS that generates a modulated signal (carrier wave) is formed in the semiconductor chip CHP2. The modulated signal generation unit MSG is so configured as to generate the modulated signal of, for example, several hundreds kHz. A bias voltage 103 is applied to the modulated signal 102 generated in the modulated signal generation unit MSG, and applied to the movable part 5. That is, the modulated signal 102 generated in the modulated signal generation unit MSG is applied to the movable part 5 through a modulated signal supply terminal TE5. With this configuration, the movable part 5 is oscillated by means of the modulated signal 102 of several hundreds kHz.

A physical quantity calculation unit PCU is formed in the semiconductor chip CHP2. The physical quantity calculation unit PCU is connected to the physical quantity calculation terminal TE1 and the physical quantity calculation terminal TE2. The physical quantity calculation unit PCU includes a voltage transforming unit CVT, an A/D transforming unit ADT, a first synchronous detection unit FDU, a low-pass filter LPF1, and a calculation unit CU.

The voltage transforming unit CVT has an operational amplifier OP1 that transforms a capacitance change of the capacitive element C1 into a voltage signal, an operational amplifier OP2 that transforms a capacitance change of the capacitive element C2 into a voltage signal, and an operational amplifier OP3 that receives an output of the operational amplifier OP1 and an output of the operational amplifier OP2 for amplification. A negative terminal of the operational amplifier OP1 is connected to the capacitive element C1 through the physical quantity calculation terminal TE1, and a reference capacitance Cf1 is connected between the negative terminal of the operational amplifier OP1 and the output of the operational amplifier OP1. A bias voltage 104 is applied to a positive terminal of the operational amplifier OP1. Likewise, a negative terminal of the operational amplifier OP2 is connected to the capacitive element C2 through the physical quantity calculation terminal TE2. A reference capacitance Cf2 is connected between the negative terminal of the operational amplifier OP2 and the output of the operational amplifier OP2. The bias voltage 104 is applied to a position terminal of the operational amplifier OP2. An output of the operational amplifier OP1 is inputted to the negative terminal of the operational amplifier OP3, and an output of the operational amplifier OP2 is inputted to the positive terminal of the operational amplifier OP3.

The A/D transforming unit ADT is configured to transform an analog signal output from the voltage transforming unit CVT into a digital signal. The first synchronous detection unit FDU is configured to restore an original signal of the low frequency from the signal that has been transformed into the high frequency signal by means of the carrier wave. The low-pass filter LPF1 is configured to attenuate the signal of the high frequency, and allow the signal of the low frequency to pass therethrough. The calculation unit CU is configured to calculate the acceleration signal according to the signal that has passed through the low-pass filter LPF1.

The acceleration sensor according to the first embodiment is configured as described above, and the operation of detecting the acceleration will be described below.

First, the modulated signal 102 of several hundreds kHz (carrier frequency) generated in the modulated signal generation unit MSG is applied to the movable part 5 from the modulated signal supply terminal TE5. As a result, the movable part 5 oscillates at the carrier frequency (several hundreds kHz). Since the oscillation is very quick, it is assumed that there is no capacitance change in the capacitive element C1 and the capacitive element C2 due to the oscillation. In this state, when the acceleration is applied from the external, the movable part 5 is displaced. For example, when the movable part 5 is displaced to an upper side of FIG. 4, the capacitance of the capacitive element C1 is larger because a distance between the detection movable electrode 6a and the detection fixed electrode 6b is shorter in the capacitive element C1. On the other hand, the capacitance of the capacitive element C2 is smaller because a distance between the detection movable electrode 6a and the detection fixed electrode 6c is longer in the capacitive element C2. The capacitance change of the capacitive element C1 and the capacitance change of the capacitive element C2 result in a change of an external force response frequency (DC to several tens Hz) corresponding to the acceleration applied from the external. In this case, since the modulated signal 102 is applied to the movable part 5, the capacitance change of the external force response frequency (DC to several tens Hz) is superimposed on the carrier frequency (several hundreds kHz).

Thereafter, a current flows in the negative terminal of the operational amplifier OP1, which is connected to the physical quantity calculation terminal TE1, on the basis of the capacitance change of the capacitive element C1 and the amplitude of the modulated signal 102. As a result, in the operational amplifier OP1, a voltage signal determined according to a ratio of the capacitance change of the capacitive element C1 and the reference capacitance Cf1 is outputted from the operational amplifier OP1. Likewise, a current flows in the negative terminal of the operational amplifier OP2, which is connected to the physical quantity calculation terminal TE2, on the basis of the capacitance change of the capacitive element C2 and the amplitude of the modulated signal 102. As a result, in the operational amplifier OP2, a voltage signal determined according to a ratio of the capacitance change of the capacitive element C2 and the reference capacitance Cf2 is outputted from the operational amplifier OP2. In this way, the capacitance change of the capacitive element C1 is transformed into the voltage signal by the operational amplifier OP1, and the capacitance change of the capacitive element C2 is transformed into the voltage signal by the operational amplifier OP2. A difference between the voltage signal output from the operational amplifier OP1 and the voltage signal output from the operational amplifier OP2 is amplified by the operational amplifier OP3, and a voltage signal is outputted from the voltage transforming unit CVT. The voltage signal (analog signal) output from the voltage transforming unit CVT has the voltage signal of the external response frequency (DC to several tens Hz) superimposed on the carrier frequency (several hundreds kHz).

In this case, the capacitive element C1 and the capacitive element C2 are formed (adjusted) to provide the same capacitance in a state where no acceleration is applied from the external. For that reason, when no acceleration is applied, the output signal from the operational amplifier OP1 and the output signal from the operational amplifier OP2 cancel each other, and the output signal from the operational amplifier OP3 becomes 0.

Then, the voltage signal output from the voltage transforming unit CVT (voltage signal having the voltage signal of the external force response frequency (DC to several tens Hz) superimposed on the carrier frequency (several hundred kHz)) is inputted to the A/D transforming unit ADT, and then transformed into a digital signal by the A/D transforming unit ADT. Then, the voltage signal that has been transformed into the digital signal is inputted to the first synchronous detection unit FDU.

The first synchronous detection unit FDU implements synchronous detection with the use of the frequency and phase of the modulated signal 102. That is, the first synchronous detection unit FDU restores the voltage signal of the external force frequency (DC to several tens Hz) from the voltage signal (digital signal) having the voltage signal of the external force response frequency (DC to several tens Hz) superimposed on the carrier frequency (several hundreds kHz). Thereafter, the restored voltage signal is inputted to the low-pass filter LPF1, and allows high frequency components other than a required signal to be attenuated. The calculation unit CU calculates and outputs the acceleration signal on the basis of the voltage signal (DC to several tens Hz) output from the low-pass filter LPF1. In this way, the acceleration can be detected by the acceleration sensor according to the first embodiment. In this situation, as described above, the movable part 5 of the acceleration sensor is oscillated with the carrier wave of several hundreds kHz, whereby the capacitance change of DC to several tens Hz due to the acceleration is superimposed on the high frequency signal, and the high frequency signal is processed. Therefore, the effect of the 1/f noise can be suppressed to improve the S/N ratio, and the detection precision of the acceleration signal can be improved.

The above-mentioned acceleration sensor is, for example, used as a key device for an attitude control system that suppresses the sideslip and spin of a vehicle to assist safe travel. In the attitude control system, an output of an engine and a braking force of a brake are controlled on the basis of the output from the acceleration sensor to suppress the sideslip and spin of the vehicle. From this viewpoint, there is a high possibility that a failure of the acceleration sensor leads to an accident, and when the acceleration sensor fails, this fact needs to be immediately announced.

Under the circumstances, it is desirable that the presence/absence of the failure can be diagnosed while operating the acceleration sensor from the viewpoint of detecting the failure immediately. Accordingly, there is the acceleration sensor of a type that has a function for diagnosing the presence/absence of the failure while conducting the operation. The acceleration sensor according to the first embodiment can diagnose the presence/absence of the failure while conducting the operation. Hereinafter, the configuration of the acceleration sensor having a constant diagnosis function for determining the presence/absence of the failure of the acceleration sensor while detecting the acceleration will be described.

Referring to FIG. 4, the movable part 5 of the MEMS structure formed in the semiconductor chip CHP1 is shown, and a capacitative element C3 that is a forced oscillation generation unit is formed between the movable part 5 and a diagnostic signal supply terminal TE3. The capacitative element C3 is made up of the diagnosis movable electrode 8a and the diagnosis fixed electrode 8b. Also, a capacitative element C4 is formed between the movable part 5 and a diagnostic signal supply terminal TE4. The capacitative element C4 is made up of the diagnosis movable electrode 8a and the diagnosis fixed electrode 8c.

The diagnostic signal generation unit DSG for generating the diagnostic signal and the abnormality determination unit WDU are formed in the semiconductor chip CHP2. The diagnostic signal generation unit DSG is so configured as to generate the diagnostic signal of, for example, several hundreds Hz. The diagnostic signal is configured by, for example, a rectangular wave, a sine wave, or a chopping wave. A bias voltage 101 is applied to a diagnostic signal 100 generated by the diagnostic signal generation unit DSG so as to be applied to the capacitative element C3 and the capacitative element C4. That is, the diagnostic signal 100 generated by the diagnostic signal generation unit DSG is applied to the capacitative element C3 and the capacitative element C4 through the diagnostic signal supply terminal TE3 and the diagnostic signal supply terminal TE4. Also, the abnormality determination unit WDU is connected to the physical quantity calculation terminal TE1 and the physical quantity calculation terminal TE2, which are formed in the semiconductor chip CHP1, through the physical quantity calculation unit PCU. In other words, the abnormality determination unit WDU is connected indirectly to the physical quantity calculation terminal TE1 and the physical quantity calculation terminal TE2.

In the acceleration sensor configured as described above, the respective diagnostic signals 100 are supplied to the diagnosis fixed electrode 8b and the diagnosis fixed electrode 8c as two signals reverse in phase from each other. With this configuration, respective electrostatic forces are exerted between the diagnosis movable electrode 8a and the diagnosis fixed electrode 8b, and between the diagnosis movable electrode 8a and the diagnosis fixed electrode 8c. As a result, the movable part 5 can be forcedly oscillated. When the movable part 5 is forcedly oscillated, the movable part 5 is displaced. When the movable part 5 is displaced, the capacitance change occurs in the capacitative element C1 and the capacitative element C2 which configure the capacitance detection unit. The capacitance changes occurring in the capacitative element C1 and the capacitative element C2 are transformed into the voltage signal by the voltage transforming unit CVT, and the voltage signal transformed by the voltage transforming unit CVT passes through the A/D transforming unit ADT and the first synchronous detection unit FDU so as to be restored to the original diagnostic signal. The restored diagnostic signal is inputted to the abnormality determination unit WDU, and processed to determine the presence/absence of the abnormality. In this way, according to the acceleration sensor of the first embodiment, the presence/absence of the abnormality of the acceleration sensor is determined.

Further, when the acceleration (DC to several tens Hz) is applied from the external while the movable part 5 is forcedly oscillated by applying the diagnostic signal of several hundreds Hz to the movable part 5, the capacitance change (several hundreds Hz) due to the forced oscillation and the capacitance change (DC to several tens Hz) due to the acceleration are applied to the capacitative element C1 and the capacitative element C2 which are the capacitance detection unit. The capacitance change of several hundreds Hz and the capacitance change of DC to several tens Hz are superimposed on the modulated signal (several hundreds kHz). Thereafter, the above-mentioned capacitance change is transformed into the voltage signal by the voltage transforming unit CVT. In the voltage signal, the voltage signal of several hundreds Hz and the voltage signal of DC to several tens Hz are superimposed on the modulated signal (several hundreds kHz). Thereafter, the voltage signal passes through the A/D transforming unit ADT and the first synchronous detection unit FDU, and is restored to the diagnostic signal of several hundreds Hz and the voltage signal of DC to several tens Hz. In the physical quantity calculation unit PCU, the diagnostic signal of several hundreds Hz is attenuated by the low-pass filter LPF1 to extract the voltage signal of DC to several tens Hz, and the acceleration signal is calculated on the basis of the voltage signal. On the other hand, in the abnormality determination unit WDU, processing is implemented on the basis of the diagnostic signal of several hundreds Hz to determine the abnormality. In the above-mentioned manner, according to the acceleration sensor of the first embodiment, the presence/absence of the abnormality in the acceleration sensor can be determined while detecting the acceleration.

As illustrated in FIG. 4, the feature of the acceleration sensor according to the first embodiment resides in that the capacitative element C1 and the capacitative element C2, which constitute the capacitance detection unit, and the capacitative element C3 and the capacitative element C4, which constitute the forced oscillation generation unit, are electrically separated from each other. That is, in the first embodiment, the diagnosis movable electrode 8a that constitutes the capacitative element C3 and the capacitative element C4 is formed integrally with the movable part 5. On the other hand, the diagnosis fixed electrode 8b and the diagnosis fixed electrode 8c are electrically separated from the detection fixed electrode 6b and the detection fixed electrode 6c. With this configuration, the high-precision acceleration sensor that can suppress the false detection can be provided. The reasons will be described below.

For example, the output signal (acceleration signal) from the above-mentioned acceleration sensor of the capacitance type greatly depends on electric charges generated between each electrodes of the capacitative element C1 and the capacitative element C2, which constitute the capacitance detection unit, and a temporal change in the electric charges. Accordingly, for the purpose of detecting the fine capacitance change with a high precision, there is a need to avoid interference due to an unnecessary electric signal as much as possible. In particular, in the acceleration sensor illustrated in FIG. 4, one modulated signal 102 is inputted to the movable part 5. Further, on the modulated signal 102 is superimposed the DC-like bias voltage 103, and the bias voltage 103 frequently has the same amplitude as that of the DC-like bias voltage 104 which is applied to the positive terminals of the operational amplifier OP1 and the operational amplifier OP2, which constitute the voltage transforming unit CVT.

In this case, the acceleration sensor having no independent forced oscillation generation unit is required to take the following means for supplying the diagnostic signal. That is, in order to forcedly oscillate the movable part 5 by the aid of the electrostatic force, a potential difference is required to be created between the detection fixed electrode 6b and the movable part 5 of the capacitative element C1, and between the detection fixed electrode 6c and the movable part 5 of the capacitative element C2. In this case, there is a need to supply the diagnostic signal directly to the detection fixed electrode 6b and the detection fixed electrode 6c, or to electrically separate the positive terminal of the operational amplifier OP1 and the positive terminal of the operational amplifier OP2 from each other, and supply the diagnostic signals inverse in phase to the respective terminals.

However, in this case, there arises a first problem that because the diagnostic signal is electrically supplied directly to the capacitative element C1 and the capacitative element C2, which constitute the capacitance detection unit, the supplied diagnostic signal affects the charge quantity which is inputted to the voltage transforming unit CVT, and an offset drift that the zero point of the acceleration sensor is varied occurs. When such an offset drive occurs, although no acceleration is applied to the acceleration sensor, the acceleration sensor acts as if the acceleration is applied. This fact expresses that the acceleration sensor conducts the false detection. In particular, the above-mentioned problem remarkably appears when the capacitative element C1 and the capacitative element C2, which constitute the capacitance detection unit, are initially or temporally varied.

Also, there arises a second problem that when the diagnostic signal is supplied directly to the capacitative element C1 and the capacitative element C2, which constitute the capacitance detection unit, the diagnostic signal is a periodic signal including a high frequency component, and noise is generated by supplying the diagnostic signal. That is, the output signal of the acceleration sensor greatly depends on electric charges generated between each electrodes of the capacitative element C1 and the capacitative element C2, which constitute the capacitance detection unit, and a temporal change in the electric charges. For that reason, when electric noise is generated in the capacitative element C1 and the capacitative element C2, which constitute the capacitance detection unit, the noise greatly affects the output signal of the acceleration sensor, and causes the false detection.

Further, there arises a third problem that, in the acceleration sensor illustrated in FIG. 4, when the diagnostic signal is supplied directly to the detection fixed electrode 6b and the detection fixed electrode 6c, a large potential difference is generated between the negative electrode and the positive electrode of each of the operational amplifier OP1 and the operational amplifier OP2. Likewise, when the positive terminal of the operational amplifier OP1 and the positive terminal of the operational amplifier OP2 are electrically separated from each other, and the diagnostic signals inverse in phase are supplied to the respective positive terminals, a large potential difference is generated between the negative electrode and the positive electrode of each of the operational amplifier OP1 and the operational amplifier OP2. The operational amplifier OP1 and the operational amplifier OP2 are usually employed so as to amplify the weak potential difference several thousands times to several ten thousands times in a state where the positive terminal and the negative terminal of each operational amplifier have substantially the same potential (imaginary short). Accordingly, when a large potential difference occurs between the negative terminal and the positive terminal of each of the operational amplifier OP1 and the operational amplifier OP2, the outputs of the operational amplifier OP1 and the operational amplifier OP2 are saturated, and normal operation is not conducted.

On the contrary, as in the acceleration sensor according to the first embodiment, in the case of the configuration in which the capacitative element C1 and the capacitative element C2, which configure the capacitance detection unit, and the capacitative element C3 and the capacitative element C4, which configure the forced oscillation generation unit, are electrically separated from each other, the diagnostic signal is not supplied electrically directly to the capacitative element C1 and the capacitative element C2, which configure the sensitive capacitance detection unit. For that reason, the diagnostic signal can be supplied to the movable part 5 without the above-mentioned problems. That is, as illustrated in FIG. 4, when the capacitative element C1 and the capacitative element C2, which configure the capacitance detection unit, and the capacitative element C3 and the capacitative element C4, which configure the forced oscillation generation unit, are electrically separated from each other, the diagnostic signal supplied to the capacitative element C3 and the capacitative element C4 does not electrically adversely affect the capacitative element C1 and the capacitative element C2 directly. On the other hand, the forced oscillation (diagnostic signal) generated by the forced oscillation generation unit made up of the capacitative element C3 and the capacitative element C4 can be transmitted as the capacitance changes of the capacitative element C1 and the capacitative element C2. As described above, according to the acceleration sensor of the first embodiment, since the forced oscillation generation unit is electrically separated from the capacitance detection unit and the voltage transforming unit, the interference of the signals from the respective units can be suppressed. As a result, even in the case of the constant diagnosis in which diagnosis is conducted while detecting the acceleration, there can be provided the high-precision acceleration sensor that can prevent the deterioration of the sensor performance due to electric coupling or noise, and suppresses the false detection.

Subsequently, the detailed configuration of the abnormality determination unit WDU illustrated in FIG. 4 will be described. Referring to FIG. 4, the abnormality determination unit WDU includes a second synchronous detection unit SDU, a low-pass filter LPF2, a comparison unit CP, and a determination unit DU. The second synchronous detection unit SDU is configured to extract the diagnostic signal of several hundreds Hz from signals including the diagnostic signal of several hundreds Hz and the voltage signal of DC to several tens Hz which are outputted from the first synchronous detection unit FDU of the physical quantity calculation unit PCU. More specifically, when it is assumed that the diagnostic signal of several hundreds Hz is cos wt, the second synchronous detection unit SDU is configured to multiply the signals including the diagnostic signal of several hundreds Hz and the voltage signal of DC to several tens Hz by cos wt. The diagnostic signal of several hundreds Hz results in cos wt×cos wt=½(cos 2wt+cos 0). That is, the diagnostic signal of several hundreds Hz is transformed into a signal of twice (cos 2wt) the frequency of the diagnostic signal (a signal having a second detection frequency) and a DC signal (cos 0) (a signal having a first detection frequency). On the other hand, the voltage signal of DC to several tens Hz is multiplied by cos wt into the signal of several hundreds Hz band. In this way, the second synchronous detection unit SDU is configured to detect the diagnostic signal of several hundreds Hz, and transform the signal into the signal with twice the frequency and the DC signal.

The low-pass filter LPF2 is configured to attenuate the signal of cos 2wt (signal of twice the frequency of the diagnostic signal) and the signal of cos wt, and allow the DC signal (cos 0) to pass therethrough. The low-pass filter LPF2 enables the DC signal (cos 0) into which the diagnostic signal of several hundreds Hz has been transformed to be extracted.

The comparison unit CP is configured to compare the DC signal (cos 0) that has passed through the low-pass filter LPF2 with a reference voltage. In this case, because an object to be compared is the DC signal (cos 0), there is advantageous in that the configuration of the comparison unit CP can be simplified.

The determination unit DU is configured to determine whether there is an abnormality in the acceleration sensor, or not, on the basis of the comparison result of the comparison unit CP.

The acceleration sensor according to the first embodiment is configured as described above, and the operation of diagnosing the presence/absence of the abnormality while detecting the acceleration will be described.

In FIG. 4, the respective diagnostic signals 100 are supplied to the diagnosis fixed electrode 8b and the diagnosis fixed electrode 8c as two signals inverse in phase from each other. With this configuration, respective electrostatic forces are exerted between the diagnosis movable electrode 8a and the diagnosis fixed electrode 8b, and between the diagnosis movable electrode 8a and the diagnosis fixed electrode 8c. As a result, the movable part 5 can be forcedly oscillated. When the movable part 5 is forcedly oscillated, the movable part 5 is displaced. When the movable part 5 is displaced, the capacitance change occurs in the capacitative element C1 and the capacitative element C2 which configure the capacitance detection unit.

In this state, when the acceleration (DC to several tens Hz) is applied from the external, the capacitance change (several hundreds Hz) due to the forced oscillation and the capacitance change (DC to several tens Hz) due to the acceleration are applied to the capacitative element C1 and the capacitative element C2, which are the capacitance detection unit. The capacitance change of several hundreds Hz and the capacitance change of DC to several tens Hz are superimposed on the modulated signal (several hundreds kHz). Thereafter, the above-mentioned capacitance change is transformed into the voltage signal by the voltage transforming unit CVT. In the voltage signal, the voltage signal of several hundreds Hz and the voltage signal of DC to several tens Hz are superimposed on the modulated signal (several hundreds kHz). Thereafter, the voltage signal passes through the A/D transforming unit ADT and the first synchronous detection unit FDU, and is restored to the diagnostic signal of several hundreds Hz and the voltage signal of DC to several tens Hz. In the physical quantity calculation unit PCU, the diagnostic signal of several hundreds Hz is attenuated by the low-pass filter LPF1 to extract the voltage signal of DC to several tens Hz, and the acceleration signal is calculated on the basis of the voltage signal.

On the other hand, the signals including the diagnostic signal of several hundreds Hz and the voltage signal of DC to several tens Hz, which have been output from the first synchronous detection unit FDU are inputted to the second synchronous detection unit SDU. In the second synchronous detection unit SDU, the diagnostic signal of several hundreds Hz is transformed into a signal of twice (cos 2wt) the frequency of the diagnostic signal, and the DC signal (cos 0). On the other hand, the voltage signal of DC to several tens Hz is multiplied by cos wt into a signal of several hundreds Hz band.

Subsequently, the signal output from the second synchronous detection unit SDU is inputted to the low-pass filter LPF2. The signal with twice (cos 2wt) the frequency of the diagnostic signal, and the signal of several hundreds Hz band obtained by multiplying the voltage signal of DC to several tens Hz by cos wt are attenuated, and the DC signal (cos 0) corresponding to the diagnostic signal passes through the low-pass filter LPF2.

Thereafter, the comparison unit CP compares the DC signal (cos 0) that has passed through the low-pass filter LPF2 with a reference voltage. The determination unit DU determines whether there is an abnormality in the acceleration sensor, or not, on the basis of the comparison result of the comparison unit CP. In the above-mentioned manner, according to the acceleration sensor of the first embodiment, the presence/absence of the abnormality in the acceleration sensor can be determined while detecting the acceleration. Therefore, according to the acceleration sensor of the first embodiment, a failure can be detected immediately.

In specifically, the presence/absence of the abnormality in the abnormality determination unit WDU can be determined as follows. For example, a given reference voltage is set to the comparison unit CP, and compared with the DC signal (cos 0) that has passed through the low-pass filter LPF2. For example, when the DC signal (cos 0) output from the low-pass filter LPF2 is substantially 0 although the diagnostic signal 100 is supplied to the movable part 5, it can be determined that a failure occurs because there is fixation in the movable part 5. On the other hand, in the case of the sensitivity scale abnormality that the natural frequency of the movable part 5 is decreased due to the damaged beams 4 or the like, and the movable part 5 is excessively displaced in response to the applied acceleration, because a signal larger than the reference voltage is inputted from the low-pass filter, it can be determined that there is the abnormality.

Also, in the acceleration sensor according to the first embodiment, as illustrated in FIG. 4, the diagnostic signal 100 can be turned on/off by a switch SW1. With this configuration, the following advantages are obtained. For example, it is assumed that the environments under which the acceleration sensor according to the first embodiment is installed have the oscillation disturbance of the same frequency band as that of the diagnostic signal 100. In this case, when no switch SW1 is provided, it cannot be determined whether the forced oscillation of the movable part 5 depends on the diagnostic signal, or the oscillation disturbance, thereby resulting in the possibility that a wrong diagnosis is conducted.

On the contrary, according to the acceleration sensor of the first embodiment, the switch SW1 is provided. For that reason, statistical data processing such that the switch SW1 is periodically turned on/off, and averaging is conducted by a sample and hold method or the like, or a difference value between an output (DC signal (cos 0) (a signal having the first detection frequency) when the switch SW1 is on, and an output (DC signal (cos 0) (a signal having the first detection frequency) when the switch SW1 is off is used to determine the failure. As a result, an effect of the oscillation disturbance in the background can be removed. That is, when the movable part 5 oscillates due to the oscillation disturbance of the same frequency band as that of the diagnostic signal 100, a given output signal is outputted from the low-pass filter LPF2 regardless of the on/off state of the switch SW1. On the other hand, in the case where the diagnostic signal 100 is supplied, when the switch SW1 turns on, a given output signal is outputted from the low-pass filter LPF2. However, when the switch SW1 turns off, an output from the low-pass filter LPF2 becomes 0. Accordingly, for example, when the difference value between the output when the switch SW1 is on and the output when the switch SW1 is off is taken, it is possible to distinguish whether the forced oscillation of the movable part 5 is caused by the diagnostic signal or the oscillation disturbance. With this configuration, even when the oscillation disturbance of the same frequency band as that of the diagnostic signal exists, diagnosis can be conducted without wrong diagnosis.

Finally, the frequency of the diagnostic signal 100 will be described in detail. Because there is a need to distinguish the diagnostic signal from the signal caused by the acceleration, the frequency of the diagnostic signal 100 needs to be set to a frequency higher than the external force response frequency (DC to several tens Hz) caused by the acceleration. Further, it is desirable that the diagnostic signal 100 is sufficiently attenuated by the low-pass filter LPF1, and does not appear as the output signal of the acceleration sensor. Also, a voltage used as the diagnostic signal 100 is limited, and the forced oscillation generation unit (the capacitative element C3, the capacitative element C4) are independent from the other capacitative element C1 and capacitative element C2, but not completely shielded. Therefore, there is a risk that electrostatic coupling slightly occurs. For that reason, it is desirable that required oscillation can be conducted at a voltage as low as possible. Taking the above into consideration, the frequency of the diagnostic signal 100 is determined.

Figure 5:
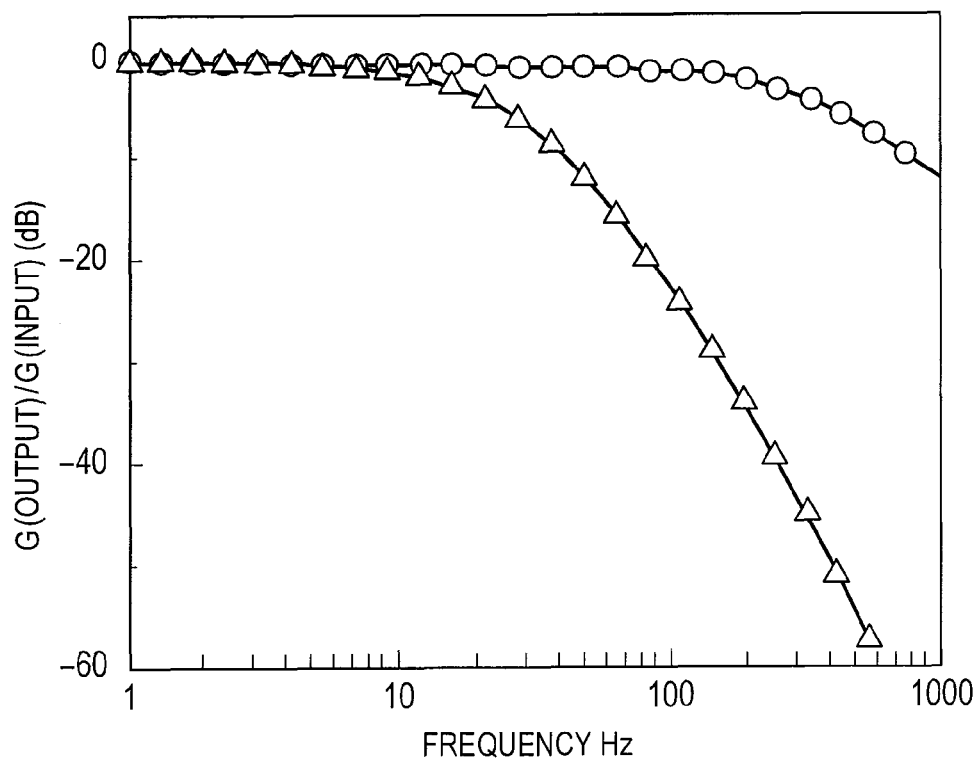
FIG. 5 is a graph showing a frequency response characteristic of the acceleration sensor according to the first embodiment.

FIG. 5 shows the frequency response characteristic of the acceleration sensor according to the first embodiment. The axis of abscissa represents the frequency, and the axis of ordinate represents a ratio of the acceleration input to the acceleration sensor and a value obtained by converting the signal output therefrom to the acceleration. Referring to FIG. 5, a curve indicated by circular marks is a signal output from a point A in FIG. 4, and corresponds to the frequency response of the movable part 5. On the other hand, a curve indicated by triangular marks is a signal output from a point B in FIG. 4, and corresponds to the frequency response of the output of the acceleration sensor.

Because the movable part 5 is designed to have a non-resonant structure, the movable part 5 has no resonance peak. As is understood from the curve indicated by the circular marks in FIG. 5, the movable part 5 has the flat frequency response characteristic up to about 300 Hz, and is displaced in proportion to the input acceleration without attenuation. The displacement is transformed into the voltage signal by the voltage transforming unit CVT, the A/D transforming unit ADT, and the first synchronous detection unit FDU illustrated in FIG. 4, and then input to the low-pass filter LPF1 illustrated in FIG. 4. The low-pass filter LPF1 has the cutoff frequency of 30 Hz, and a secondary filter characteristic. Accordingly, as is understood from the curve indicated by triangular marks in FIG. 5, as signals (signals at a point B) that have passed through the low-pass filter LPF1, signals of 30 Hz or lower are outputted among signals (signals at a point A) that have passed through the first synchronous detection unit FDU, and the other high frequency signals are attenuated.

The acceleration sensor according to the first embodiment uses a rectangular wave of 896 kHz as the modulated signal (carrier wave) 102. Although not illustrated in FIG. 5, the movable part 5 of the acceleration sensor can follow the modulated signal 102 of several hundreds kHz, and the forced oscillation of the movable part 5 due to the modulated signal 102 can be sufficiently ignored. Accordingly, in order to forcedly oscillate the movable part 5 at a diagnostic voltage as low as possible, there is a need to conduct oscillation at a frequency that can be sufficiently followed by the movable part 5. Although relevant to the attenuation performance of the low-pass filter LPF1, it is found from the curve indicated by the circular marks in FIG. 5 that the movable part 5 can be oscillated at a mechanical cutoff frequency (about 300 Hz) or lower of the movable part 5. In the first embodiment, for example, as the diagnostic signal 100, a rectangular wave of 200 Hz in frequency and 150 mG in amplitude is used. In this case, the resolution of the acceleration sensor is several to several tens mG, and 15 mG is a sufficiently distinguishable value. Further, even when the sensitivity scale of the acceleration sensor is, for example, twice or ½ times, the sensitivity scale is equal to or larger than the resolution, the abnormality of the sensitivity can be determined. That is, the amplitude of the diagnostic signal 100 can be determined according to the amplitude of the sensitivity abnormality to be diagnosed. Also, as is understood from FIG. 5, the diagnostic signal 100 of 200 Hz and 150 mG passes through the low-pass filter LPF1, and attenuates down to 1.5 mG which is about $\frac{1}{100}$ of the original signal. This is a value can be ignored from the viewpoint of resolution of the acceleration sensor. Taking the above into consideration, the frequency of the diagnostic signal 100 is determined in the first embodiment.

Second Embodiment

Figure 6:
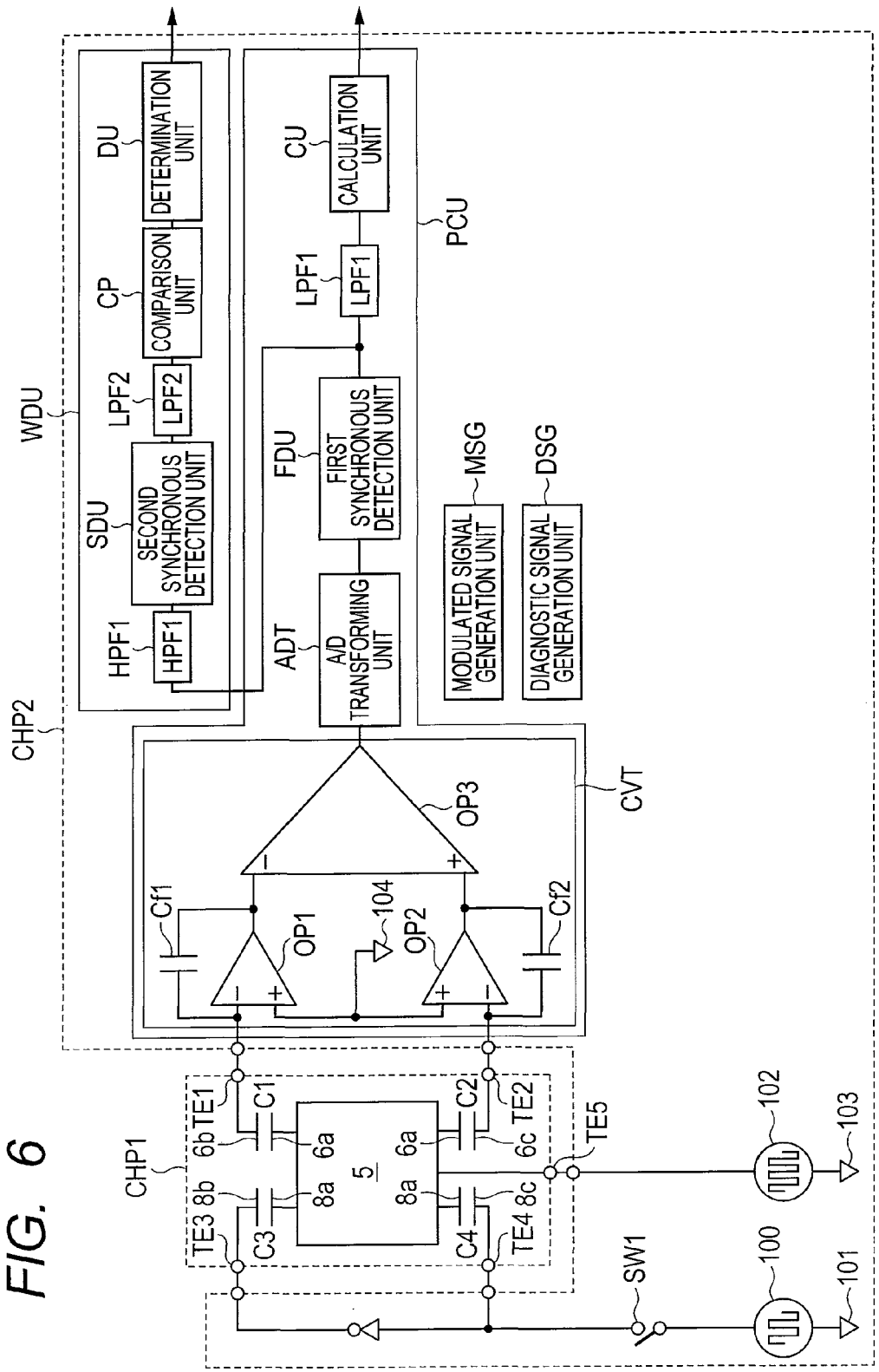
FIG. 6 is a diagram illustrating the configuration of an acceleration sensor according to a second embodiment.

An acceleration sensor according to a second embodiment will be described with reference to the accompanying drawings. FIG. 6 is a diagram illustrating the configuration of the acceleration sensor according to the second embodiment. Hereinafter, the feature of the acceleration sensor according to the second embodiment will be described, and the repetitive description of the first embodiment will be omitted.

As illustrated in FIG. 6, the feature of the acceleration sensor according to the second embodiment resides in that a high-pass filter HPF1 is disposed before the second synchronous detection unit SDU. For example, when no high-pass filter HPF1 is provided, the signals output from the first synchronous detection unit FDU include the diagnostic signal of several hundreds Hz and the voltage signal of DC to several tens Hz. Those signals are inputted to the second synchronous detection unit SDU. In the second synchronous detection unit SDU, the diagnostic signal of several hundreds Hz is transformed into a signal of twice (cos 2wt) the frequency of the diagnostic signal, and a DC signal (cos 0). On the other hand, the voltage signal of DC to several tens Hz is multiplied by cos wt into a signal of several hundreds Hz band (cos wt). When those signals are inputted to the low-pass filter LPF2, a signal of the high frequency is attenuated, and only a signal of the low frequency is outputted from the low-pass filter LPF2. More specially, the signal with twice (cos 2wt) the frequency of the diagnostic signal and the signal of several hundreds Hz band (cos wt) are attenuated, and only the DC signal (cos 0) passes through the low-pass filter LPF2. In this case, in order to sufficiently attenuate the signal of several hundreds Hz band (cos wt), there is a need to sufficiently decrease the cutoff frequency of the low-pass filter LPF2, and to increase the order of the filter. However, in this case, because a time constant of the low-pass filter LPF2 becomes longer, it takes time to conduct diagnosis. Also, because an unnecessary signal (a signal of several hundreds Hz band (cos wt)) is larger than the DC signal (cos 0) used for diagnosis, there is a risk that the signal is saturated to conduct a wrong diagnosis. Further, that the small DC signal (cos 0) is amplified and easily treated is limited.

Under the circumstances, in the second embodiment, the high-pass filter HPF1 is disposed before the second synchronous detection unit SDU. With this configuration, the voltage signal of DC to several tens Hz irrelevant to the diagnosis can be attenuated by the high-pass filter HPF1 before being input to the second synchronous detection unit SDU. As a result, the signal of several hundreds Hz band (cos wt) which has been multiplied by cos wt is reduced from the output signals from the second synchronous detection unit SDU. This means that the time constant of the low-pass filter LPF2 disposed after the second synchronous detection unit SDU can be shortened. Therefore, the second embodiment is advantageous in that the diagnosis time can be reduced. Further, the DC signal (cos 0) can be amplified into an easy-to-deal signal.

As described above, with the provision of the high-pass filter HPF1 before the second synchronous detection unit SDU, the voltage signal of DC to several tens Hz output from the first synchronous detection unit FDU is attenuated, and only the diagnostic signal of several hundreds Hz can pass through the high-pass filter HPF1. As a result, even when the large voltage signal of DC to several tens Hz exits at the time of diagnosis on an inclined surface or acceleration, high-reliability diagnosis can be realized in a short time without wrong diagnosis.

Third Embodiment

Figure 7:
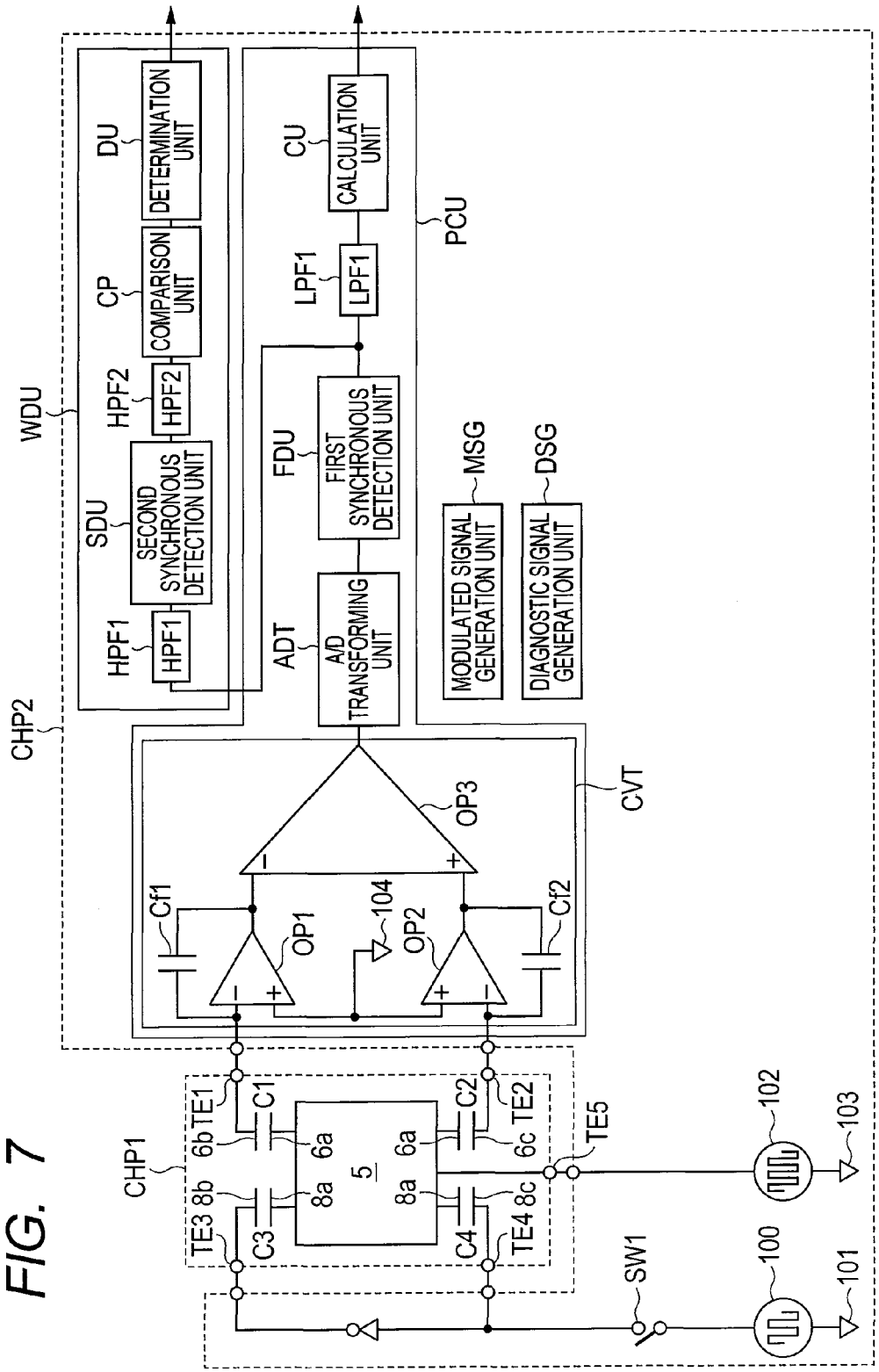
FIG. 7 is a diagram illustrating the configuration of an acceleration sensor according to a third embodiment.

An acceleration sensor according to a third embodiment will be described with reference to the accompanying drawings. FIG. 7 is a diagram illustrating the configuration of the acceleration sensor according to the third embodiment. Hereinafter, the feature of the acceleration sensor according to the third embodiment will be described, and the repetitive description of the first embodiment will be omitted.

As illustrated in FIG. 7, the feature of the acceleration sensor according to the third embodiment resides in that not the low-pass filter LPF2 but a high-pass filter HPF2 is disposed after the second synchronous detection unit SDU. As described above, the diagnostic signal of several hundreds Hz passes through the second synchronous detection unit SDU, and is transformed into a signal of twice (cos 2wt) the frequency of the diagnostic signal, and a DC signal (cos 0). In the first embodiment, the low-pass filter LPF2 is used to extract the D signal (cos 0) for conducting diagnosis. On the contrary, in the third embodiment, with the use of the high-pass filter HPF2 instead of the low-pass filter LPF2, the DC signal (cos 0) is removed, and an amplitude value of the signal with twice (cos 2wt) the frequency of the diagnostic signal is used for conducting diagnosis. In this way, with the use of the signal with twice (cos 2wt) the frequency of the diagnostic signal, a range in which the time constant of the high-pass filter HPF2 is selected is widened. Therefore, a period of time required for diagnosis can be further reduced.

For example, when a signal of 200 Hz is used as the diagnostic signal 100, the frequency of the signal (signal with twice (cos 2wt) the frequency of the diagnostic signal) input to the comparison unit CP and used for diagnosis becomes 400 Hz. Accordingly, as one example, even when the cutoff signal of the high-pass filter HPF2 is set to 100 Hz, and the high-pass filter HPF2 is configured as a primary filter, a signal close to DC can be attenuated down to a level of $\frac{1}{100}$.

Also, even in the acceleration sensor according to the third embodiment, as in the first embodiment, the provision of the switch SW1 is also effective. As in the first embodiment, statistical data processing such that the switch SW1 is periodically turned on/off, and averaging is conducted by a sample and hold method or the like, or a difference value between an output (a signal of twice (cos 2wt) the frequency of the diagnostic signal (a signal having the second detection frequency)) when the switch SW1 is on, and an output (a signal of twice (cos 2wt) the frequency of the diagnostic signal (a signal having the second detection frequency)) when the switch SW1 is off is used to determine the failure. As a result, an effect of the oscillation disturbance in the background can be removed. For example, when the difference value between the output when the switch SW1 is on and the output when the switch SW1 is off is taken, it is possible to distinguish whether the forced oscillation of the movable part 5 is caused by the diagnostic signal or the oscillation disturbance. With this configuration, even when the oscillation disturbance of the same frequency band as that of the diagnostic signal exists, diagnosis can be conducted without wrong diagnosis.

Fourth Embodiment

Figure 8:
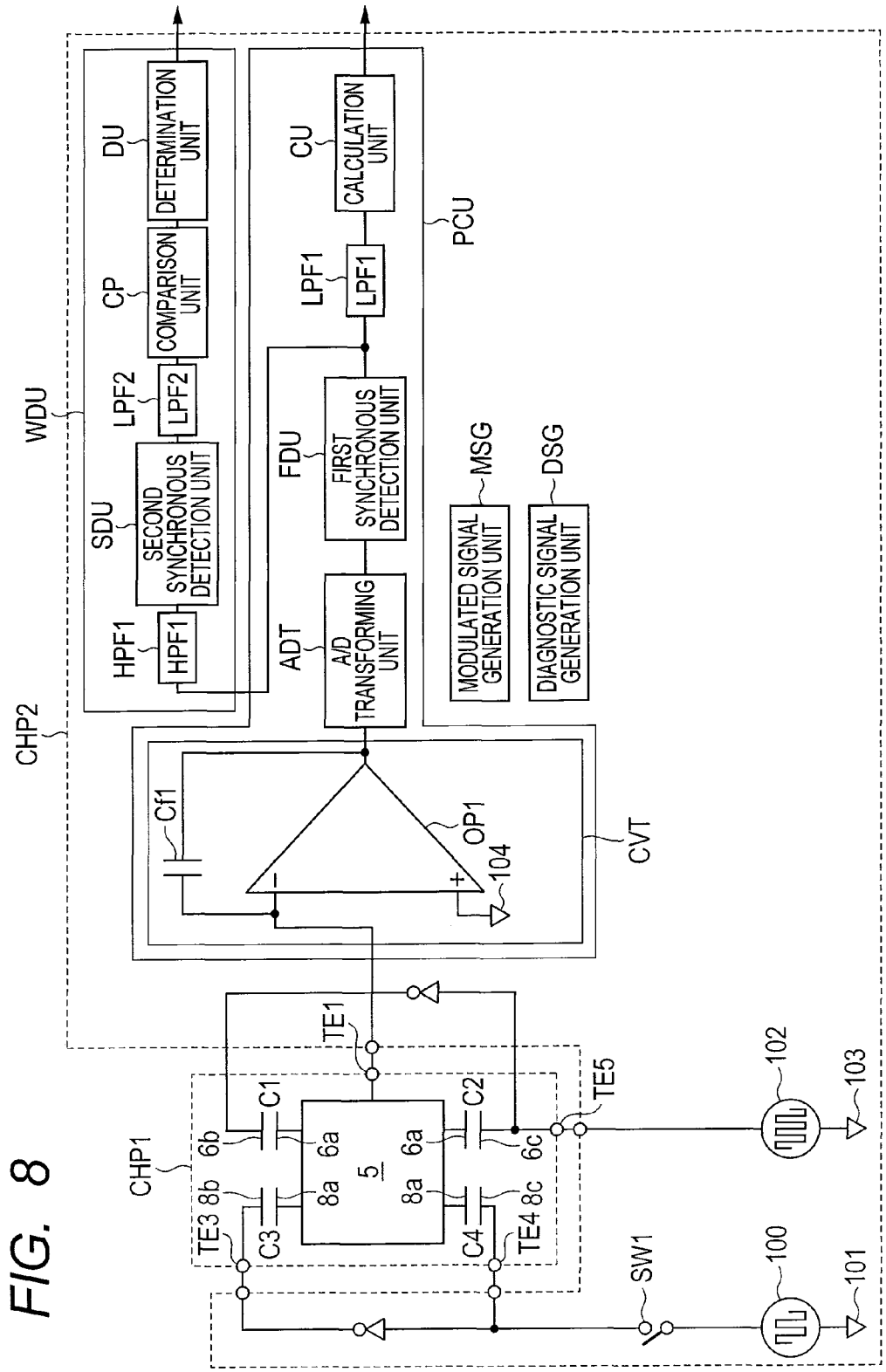
FIG. 8 is a diagram illustrating the configuration of an acceleration sensor according to a fourth embodiment.

An acceleration sensor according to a fourth embodiment will be described with reference to the accompanying drawings. FIG. 8 is a diagram illustrating the configuration of the acceleration sensor according to the fourth embodiment. Hereinafter, the feature of the acceleration sensor according to the fourth embodiment will be described, and the repetitive description of the first embodiment will be omitted.

As illustrated in FIG. 8, in the fourth embodiment, the modulated signal 102 is supplied to the detection fixed electrode 6b of the capacitative element C1 and the detection fixed electrode 6c of the capacitative element C2, which configure the capacitance detection unit. An output from the movable part 5 is inputted to the voltage transforming unit CVT, to thereby detect the displacement of the movable part 5. With this configuration, the number of operational amplifiers that configure the voltage transforming unit CVT can be reduced to one, that is, only the operational amplifier OP1. Thus, the circuit can be advantageously simplified.

Even in the acceleration sensor thus configured according to the fourth embodiment, as illustrated in FIG. 8, the capacitative element C1 and the capacitative element C2, which configure the capacitance detection unit, and the capacitative element C3 and the capacitative element C4, which configure the forced oscillation generation unit, are electrically separated from each other. That is, even in the fourth embodiment, the diagnosis movable electrode 8a that configure the capacitative element C3 and the capacitative element C4 is formed integrally with the movable part 5. On the other hand, the diagnosis fixed electrode 8b and the diagnosis fixed electrode 8c are electrically separated from the detection fixed electrode 6b and the detection fixed electrode 6c. With the above configuration, in the fourth embodiment, the high-precision acceleration sensor that can suppress the false detection can be provided as in the first embodiment.

Fifth Embodiment

Figure 9:
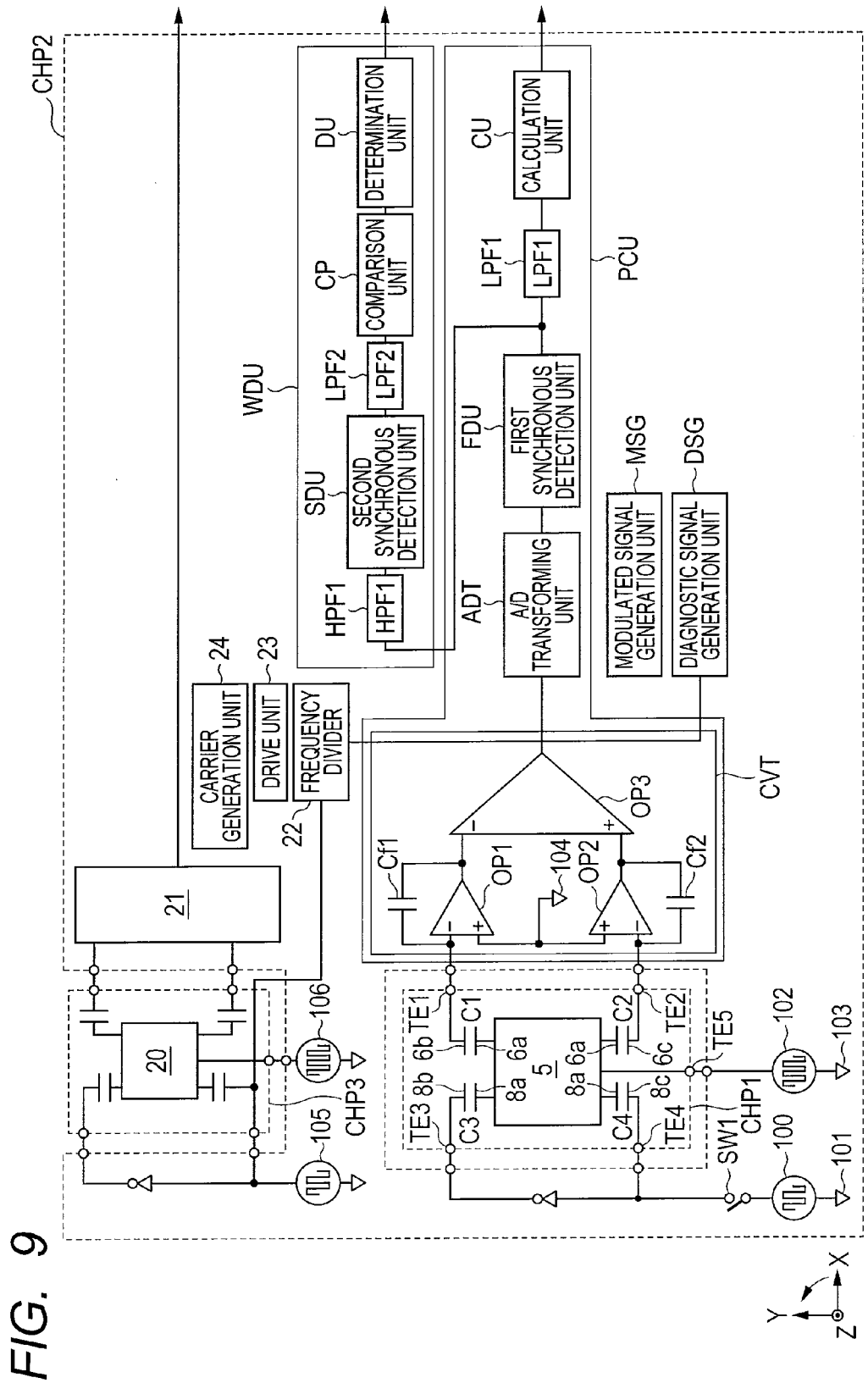
FIG. 9 is a diagram illustrating the configuration of a compound sensor according to a fifth embodiment.

A compound sensor (compound capacitance sensor) according to a fifth embodiment will be described with reference to the accompanying drawings. FIG. 9 is a diagram illustrating the configuration of the compound sensor according to the fifth embodiment. Hereinafter, the features of the compound sensor according to the fifth embodiment will be described, and the repetitive description of the first embodiment will be omitted.

The compound sensor according to the fifth embodiment can detect the applied acceleration as well as the angular velocity. The compound sensor according to the fifth embodiment is provided with the components required for detection of the acceleration and diagnosis described mainly in the above first embodiment. The compound sensor is also provided with an oscillator 20 for detecting the angular velocity, an angular velocity signal processing unit 21, a frequency divider 22, a drive unit 23, and a carrier wave generation unit 24. For example, the oscillator 20 is formed in the semiconductor chip CHP3. The angular velocity signal processing unit 21, the frequency divider 22, the drive unit 23, and the carrier wave generation unit 24 are formed in the semiconductor chip CHP2. A drive signal 105 generated in the drive unit 23 is supplied to the oscillator 20. More specifically, the drive signal 105 is supplied to the capacitative element formed in the oscillator 20, and the oscillator 20 normally oscillates in response to the drive signal 105. Further, a carrier wave 106 generated by the carrier wave generation unit 24 can be supplied to the oscillator 20. A capacitative element that detects the displacement caused by a Coriolis force is formed in the oscillator 20, and the capacitative element is connected to the angular velocity signal processing unit 21.

In the angular velocity sensor configured as described above, for the purpose of detecting the angular velocity, there is a need to allow the oscillator 20 to always normally oscillate. For example, the drive signal 105 is supplied to the oscillator 20 so that the oscillator 20 is kept to normally oscillate in the X-direction of FIG. 9. In this state, when the angular velocity is applied around a Z-axis, the Coriolis force is generated in proportion to the amplitude of the normal oscillation and the frequency of the normal oscillation of the oscillator 20, and the mass and the angular velocity of the oscillator. The oscillator 20 is displaced in the detection direction (Y-direction) by the Coriolis force. This displacement is captured as the capacitance change of the capacitative element. The capacitance change is processed by the angular velocity signal processing unit 21 to finally output an angular velocity signal. The configuration of the angular velocity signal processing unit 21 is identical with the configuration of the physical quantity calculation unit PCU described in the first embodiment. The angular velocity signal processing unit 21 includes a voltage transforming unit, an A/D transforming unit, a synchronous detection unit, a low-pass filter, a calculation unit, and so on. The components that configure the angular velocity signal processing unit 21 are identical in the configuration and the operating principle with those described in the above first embodiment, and therefore their description will be omitted.

In the drive unit 23, for the purpose of oscillating the oscillator 20 with the amplitude as large as possible and at the drive voltage as low as possible, the drive signal 105 that follows the resonance frequency of the oscillator 20 is supplied to the oscillator 20. The resonance frequency (natural frequency) of the angular velocity sensor changes depending on the surrounding temperature, the mounting form, or the temporal factor. For that reason, in order to always oscillate the oscillator 20 in a resonance mode, the frequency of the drive signal from the drive unit 23 is so changed as to follow the resonance frequency by a PLL (phase locked loop) circuit.

The feature of the compound sensor according to the fifth embodiment resides in that a frequency which is 1/(the power of 2) of the drive signal 105 generated by the drive unit 23 of the angular velocity sensor is used as the frequency of the diagnostic signal 100 of the acceleration sensor.

When the frequencies of the respective signals used for the compound sensor are arranged, there are the frequency of the drive signal 105 used for the angular velocity sensor, the frequency of the carrier wave 106 used for the angular velocity sensor, the frequency of the modulated signal 102 used for the acceleration sensor, the frequency of the diagnostic signal 100, and the on/off frequency for controlling the on/off operation of the switch SW1. The frequencies of those signals are generated inside the integrated circuits formed in the same semiconductor chip CHP2. Therefore, when the respective frequencies are designed to have a correlation, the respective frequencies can be generated from one main clock signal by using the frequency divider 22. As a result, the size of the semiconductor chip CHP2 can be scaled down, leading to the lower costs and the reduced size of the compound sensor.

For example, it is assumed that the frequency of the drive signal 105 used for the angular velocity sensor is set to 14 kHz. Because the frequency of the drive signal 105 follows the resonance frequency of the oscillator 20, it is conceivable that the frequency always slightly fluctuates. On the basis of the frequency of the drive signal 105, the carrier wave 106 can be set to, for example, 896 kHz, which is 64 times, with the use of the frequency divider (program counter) 22. Also, the frequency of the modulated signal 102 used for the acceleration sensor can be selected as occasion demands. The frequency can be set to, for example, 224 kHz. Further, the frequency of the diagnostic signal 100 is set to 219 Hz which is 1/64 of the frequency of the drive signal 105. Finally, the on/off frequency of the switch SW1 is set to 27 Hz which is 1/512 of the frequency of the drive signal 105, or 438 Hz which is 1/32 of the frequency of the drive signal 105. Those frequencies can be readily generated by using the frequency divider 22 on the basis of the drive signal 105. The above-mentioned specific numerical values of the frequencies are described for easily understanding that those frequencies can be generated from one frequency by using the frequency divider 22, and do not limit the contents and scope of the present invention.

Sixth Embodiment

Figure 10:
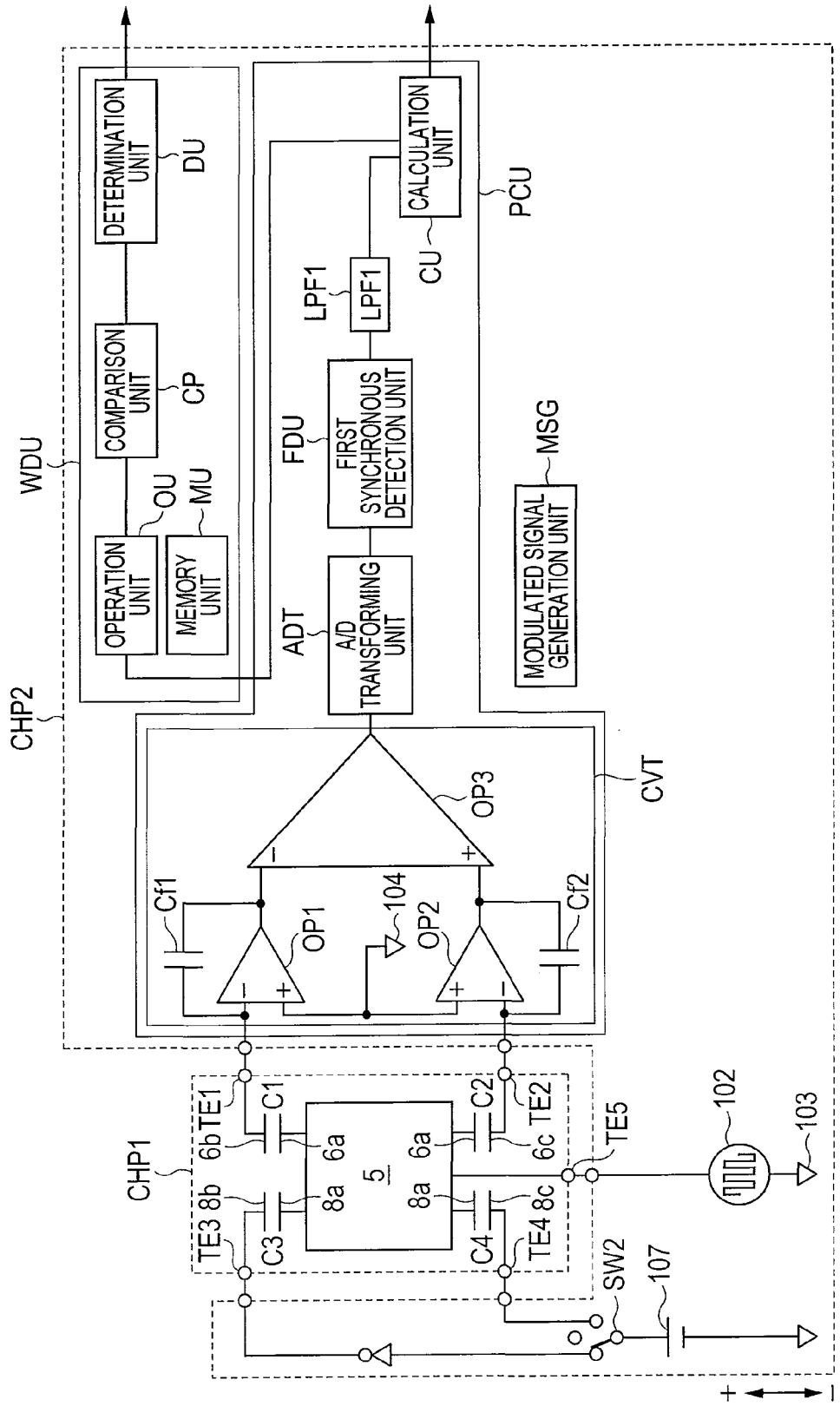
FIG. 10 is a diagram illustrating the configuration of an acceleration sensor according to a sixth embodiment.

An acceleration sensor according to a sixth embodiment will be described with reference to the accompanying drawings. FIG. 10 is a diagram illustrating the configuration of the acceleration sensor according to the sixth embodiment. Hereinafter, the feature of the acceleration sensor according to the sixth embodiment will be described, and the repetitive description of the first embodiment will be omitted.

The acceleration sensor according to the sixth embodiment can diagnose a failure with high precision even when the acceleration sensor is arranged on the inclined surface at the time of diagnosis. In the general acceleration sensor, a DC-like signal such as the gravity acceleration is frequently measured. In particular, when an object to be measured is arranged on the inclined surface, a zero-point offset where the movable part is displaced even in a state where the acceleration is not applied occurs. In this case, the acceleration sensor starts in a state where the zero-point offset occurs. In this state, when an initial diagnosis for confirming the fixation of the acceleration sensor, the abnormality of sensitivity, and the electric leakage of the respective electrodes has been conducted, there is a risk of a wrong diagnosis determining that the acceleration sensor is in failure due to the zero-point offset even if the acceleration sensor is normal.

Under the circumstances, in the sixth embodiment, the acceleration sensor that can suppress the wrong diagnosis even if the zero-point offset occurs will be described. First, the configuration of the acceleration sensor according to the sixth embodiment will be described.

FIG. 10 illustrates the movable part 5 of the MEMS structure formed in the semiconductor chip CHP1, and the capacitative element C1, which is the capacitance detection unit, is formed between the movable part 5 and the physical quantity calculation terminal TE1. The capacitative element C1 is made up of the detection movable electrode 6a and the detection fixed electrode 6b. Also, the capacitative element C2 is formed between the movable part 5 and the physical quantity calculation terminal TE2. The capacitative element C2 is made up of the detection movable electrode 6a and the detection fixed electrode 6c. The capacitative element C1 and the capacitative element C2 configure the capacitance detection unit.

Further, the capacitative element C3 is formed between the movable part 5 and the diagnostic signal supply terminal TE3. The capacitative element C3 is made up of the diagnosis movable electrode 8a and the diagnosis fixed electrode 8b. Also, the capacitative element C4 is formed between the movable part 5 and the diagnostic signal supply terminal TE4. The capacitative element C4 is made up of the diagnosis movable electrode 8a and the diagnosis fixed electrode 8c. The capacitative element C3 and the capacitative element C4 function as the forced displacement generation unit for forcedly displacing the movable part 5. More specifically, when a first diagnostic signal is supplied to the diagnostic signal supply terminal TE3 at the time of staring the operation, an electrostatic force is developed in the capacitative element C3 so that the movable part 5 can be displaced in a first direction (+ direction). On the other hand, when a second diagnostic signal is supplied to the diagnostic signal supply terminal TE4, an electrostatic force is developed in the capacitative element C4 so that the movable part 5 can be displaced in a second direction (− direction) opposite to the first direction (+ direction).

Even in the MEMS structure configured as described above, as illustrated in FIG. 10, the capacitative element C1 and the capacitative element C2, which configure the capacitance detection unit, and the capacitative element C3 and the capacitative element C4, which configure the forced displacement generation unit, are electrically separated from each other. That is, similarly, in the sixth embodiment, the diagnosis movable electrode 8a that configures the capacitative element C3 and the capacitative element C4 is formed integrally with the movable part 5. On the other hand, the diagnosis fixed electrode 8b and the diagnosis fixed electrode 8c are electrically separated from the detection fixed electrode 6b and the detection fixed electrode 6c.

Subsequently, the configuration of the signal processing circuit formed in the semiconductor chip CHP2 will be described. Referring to FIG. 10, a diagnostic signal generation unit 107 for generating the diagnostic signal is formed in the semiconductor chip CHP2. A switch SW2 is provided for changing over between a case in which the diagnostic signal is supplied from the diagnostic signal supply terminal TE3 to the capacitative element C3, and a case in which the diagnostic signal is supplied from the diagnostic signal supply terminal TE4 to the capacitative element C4. The diagnostic signal is a signal for generating the displacement corresponding to a sensor full scale (maximum measurement range) in the movable part 5 when the zero-point offset is 0. When the diagnostic signal is supplied to the capacitative element C3, the movable part 5 is forcedly displaced in the first direction (+ direction). On the other hand, when the diagnostic signal is supplied to the capacitative element C4, the movable part 5 is forcedly displaced in the second direction.

Also, the modulated signal generation unit MSG for generating the modulated signal (carrier wave) is formed in the semiconductor chip CHP2. The modulated signal generation unit MSG is so configured as to generate the modulated signal of, for example, several hundreds kHz. The bias voltage 103 is applied to the modulated signal 102 generated in the modulated signal generation unit MSG, and then applied to the movable part 5. That is, the modulated signal 102 generated in the modulated signal generation unit MSG is supplied to the movable part 5 through the modulated signal supply terminal TE5. As a result, the movable part 5 oscillates in response to the modulated signal 102 of several hundred kHz.

The physical quantity calculation unit PCU is formed in the semiconductor chip CHP2. The physical quantity calculation unit PCU is connected to the physical quantity calculation terminal TE1 and the physical quantity calculation terminal TE2. The physical quantity calculation unit PCU includes the voltage transforming unit CVT, the A/D transforming unit ADT, the first synchronous detection unit FDU, the low-pass filter LPF1, and the calculation unit CU.

The abnormality determination unit WDU is formed in the semiconductor chip CHP2. The abnormality determination unit WDU is connected to the physical quantity calculation terminal TE1 and the physical quantity calculation terminal TE2, which are formed in the semiconductor chip CHP1, through the physical quantity calculation unit PCU. In other words, the abnormality determination unit WDU is connected indirectly to the physical quantity calculation terminal TE1 and the physical quantity calculation terminal TE2. The abnormality determination unit WDU includes a memory unit MU, an operation unit OU, the comparison unit CP, and the determination unit DU.

Figure 11:
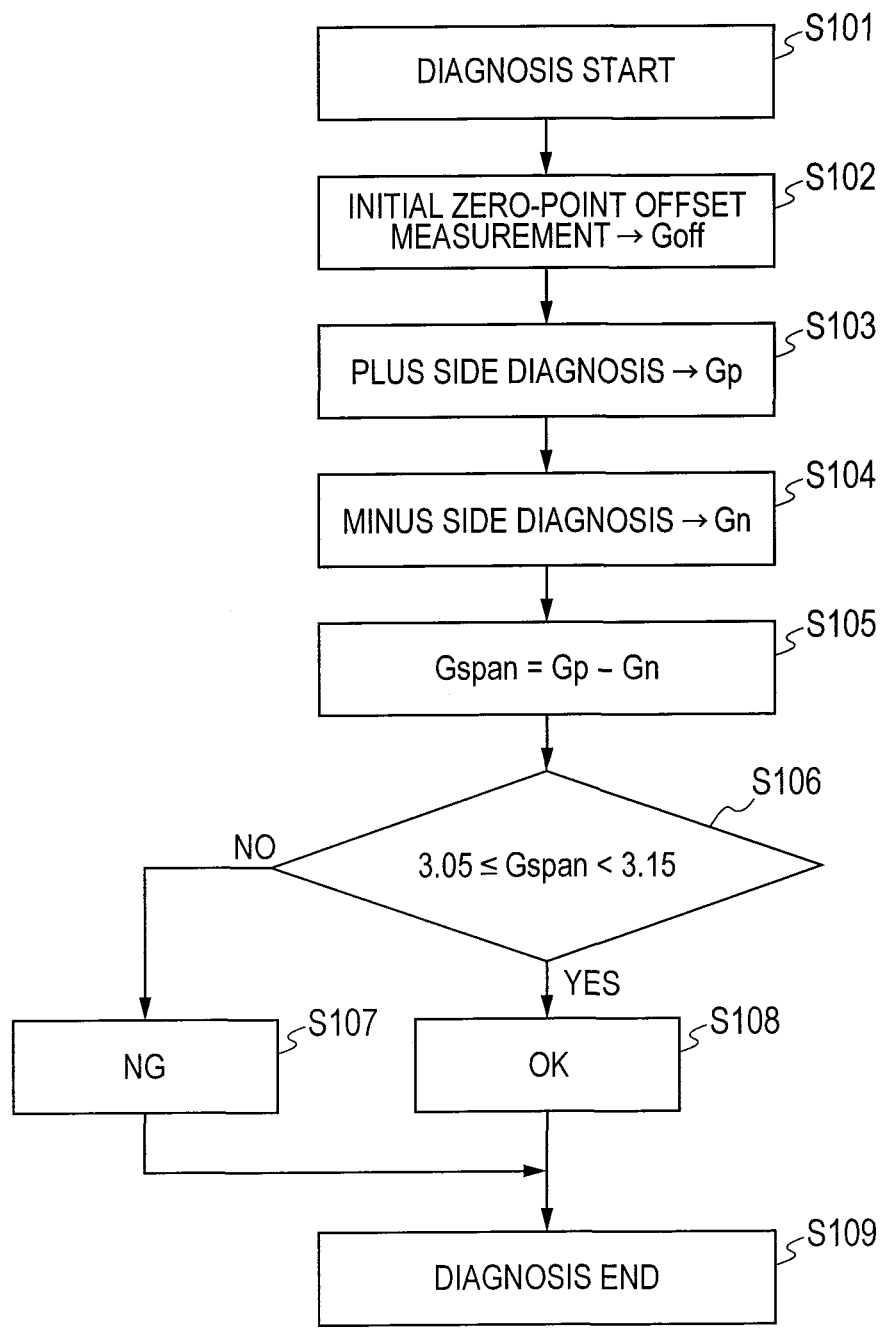
FIG. 11 is a flowchart showing a flow of an initial diagnosis according to the sixth embodiment.

The acceleration sensor according to the sixth embodiment is configured as described above, and the operation of the acceleration sensor at the time of an initial diagnosis will be described below with reference to FIGS. 10 and 11. FIG. 11 is a flowchart showing a flow of the initial diagnosis according to the sixth embodiment. First, a diagnosis starts in an initial state where the diagnostic signal is not supplied to the movable part 5 (S101). An output of the acceleration sensor (an output of the physical quantity calculation unit PCU) at the time of starting the diagnosis is read by the abnormality determination unit WDU, and stored as a zero-point offset Goff in the memory unit MU (S102). Then, the diagnostic signal is supplied to the capacitative element C3 from the diagnostic signal supply terminal TE3 by using the switch SW2. With this operation, the movable part 5 is displaced in the + direction. The output of the acceleration sensor (the output of the physical quantity calculation unit PCU) in this state is read by the abnormality determination unit WDU, and stored as Gp in the memory unit MU (S103). Then, the diagnostic signal is supplied to the capacitative element C4 from the diagnostic signal supply terminal TE4 by using the switch SW2. With this operation, the movable part 5 is displaced in the − direction. The output of the acceleration sensor (the output of the physical quantity calculation unit PCU) in this state is read by the abnormality determination unit WDU, and stored as Gn in the memory unit MU (S104). When the diagnostic signal is supplied to the diagnostic signal supply terminal TE3, the diagnostic signal supply terminal TE4 is virtually grounded (connected to the bias voltage 104 of the voltage transforming unit CVT).

Subsequently, the operation unit OU calculates a difference between Gp and Gn which have been stored in the memory unit MU, and calculates Gspan (S105). Thereafter, the comparison unit CP compares a predetermined range with Gspan calculated by the operation unit OU (S106). Then, the determination unit DU determines whether there is an abnormality in the acceleration sensor, or not, on the basis of the comparison result from the comparison unit CP. More specifically, when the determination unit DU has obtained the comparison result that Gspan is out of the predetermined range, the determination unit DU determines that there is the abnormality in the acceleration sensor (S107). On the other hand, when the determination unit DU has obtained the comparison result that Gspan falls within the predetermined range, the determination unit DU determines that the acceleration sensor is normal (S108). In this way, the initial diagnosis is terminated (S109).

Figure 12:
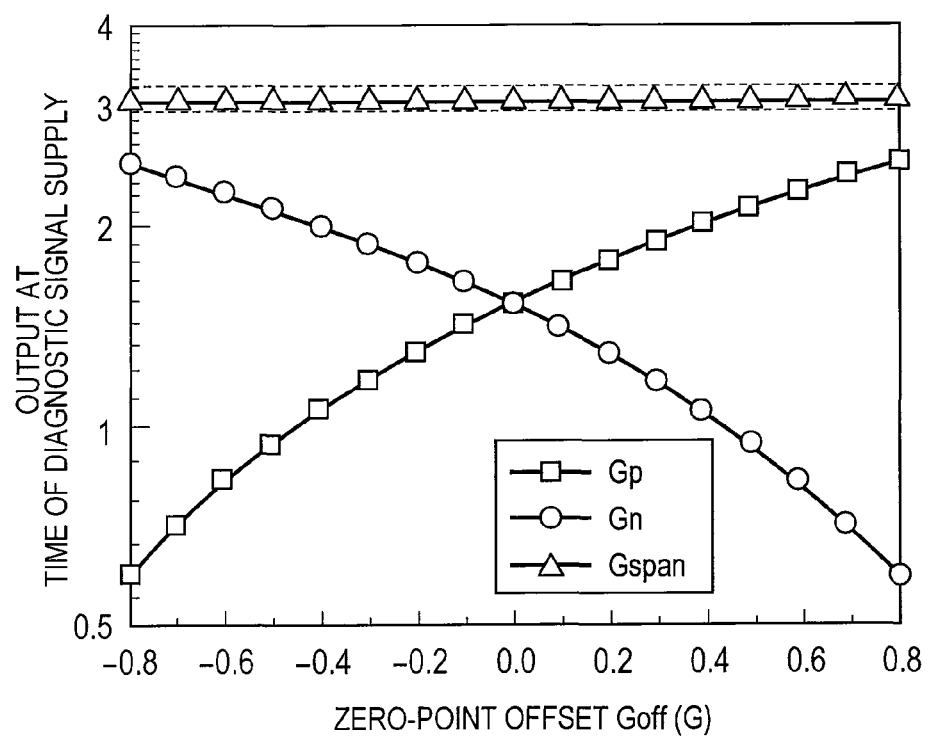
FIG. 12 is a graph showing a relationship between a zero-point offset and an output at the time of supplying a diagnostic signal.
Figure 13:
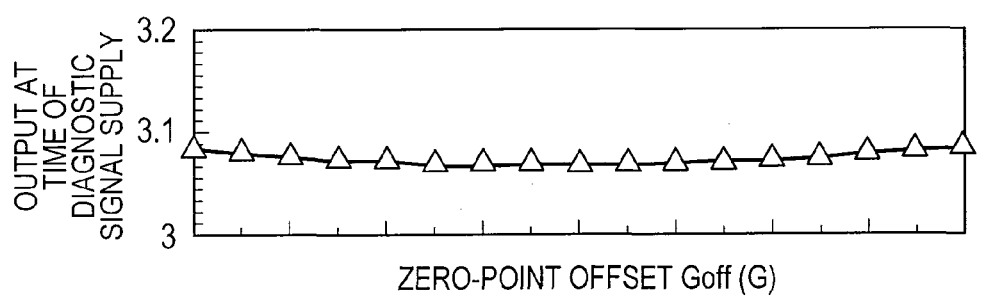
FIG. 13 is a partially enlarged graph of FIG. 12.

Subsequently, the setting of the predetermined range will be described. FIG. 12 is a graph showing a relationship between the zero-point offset Goff and the output at the time of supplying the diagnostic signal. The axis of abscissa represents the zero-point offset, and the axis of ordinate represents the output at the time of supplying the diagnostic signal. Referring to FIG. 12, a curve indicated by triangular marks represents Gspan. A curve indicated by square marks represents Gp, and a curve indicated by circular marks represents Gn (a real value is obtained by multiplying an indicated value by −1). FIG. 13 is a graph enlarging a region in which Gspan is drawn.

Referring to FIG. 12, when the zero-point offset Goff is 0, Gp and Gn are 1.525, and because the diagnosis of the acceleration sensor within the maximum measurement range (full scale) ±1.5 is conducted, Gp and Gn are values larger than 1.5. Accordingly, Gspan is 3.05 in a state where the acceleration sensor is not in failure, and the zero-point offset is 0 (a state where the acceleration sensor is put in an ideally flat state). As illustrated in FIGS. 12 and 13, when the zero-point offset exists, it is found that Gp and Gn are nonlinearly changed, and all the values of Gspan are 3.05 or more. In the sixth embodiment, the diagnosis is conducted by using the nonlinear property of the capacitative element C3 and the capacitative element C4 of the parallel plate type. That is, as shown in FIGS. 12 and 13, when the zero-point offset occurs, Gspan is always larger than that in the case where the zero-point offset is 0. On the other hand, when the movable part 5 is fixed and not moved, or when a foreign particle is held between the electrodes to limit the displacement of the movable part 5, since the displacement range is limited, Gspan becomes smaller than 3.05. Accordingly, it is found that the displacement abnormality caused by the abnormality of the acceleration sensor and the displacement caused by the zero-point offset can be separated from each other with a value (3.05) of Gspan in the case where the zero-point offset is 0 as a boundary. In the sixth embodiment, this feature is utilized to distinguish between the abnormality of the acceleration sensor and the zero-point offset. Also, when the beams 4 of the acceleration sensor are damaged so that the movable part 5 is easily moved more than that in the normal state, since Gspan is abnormally increased, an upper limit (for example, 3.15 (refer to FIG. 11) is given to Gspan, whereby this abnormality can be detected. From the above viewpoint, in the sixth embodiment, the predetermined range is set to Gspan, and only the case where Gspan is out of the predetermined range is diagnosed as the abnormality. As a result, the wrong diagnosis that a state in which the acceleration sensor is normal, and the zero-point offset occurs is abnormal can be suppressed.

Figure 14:
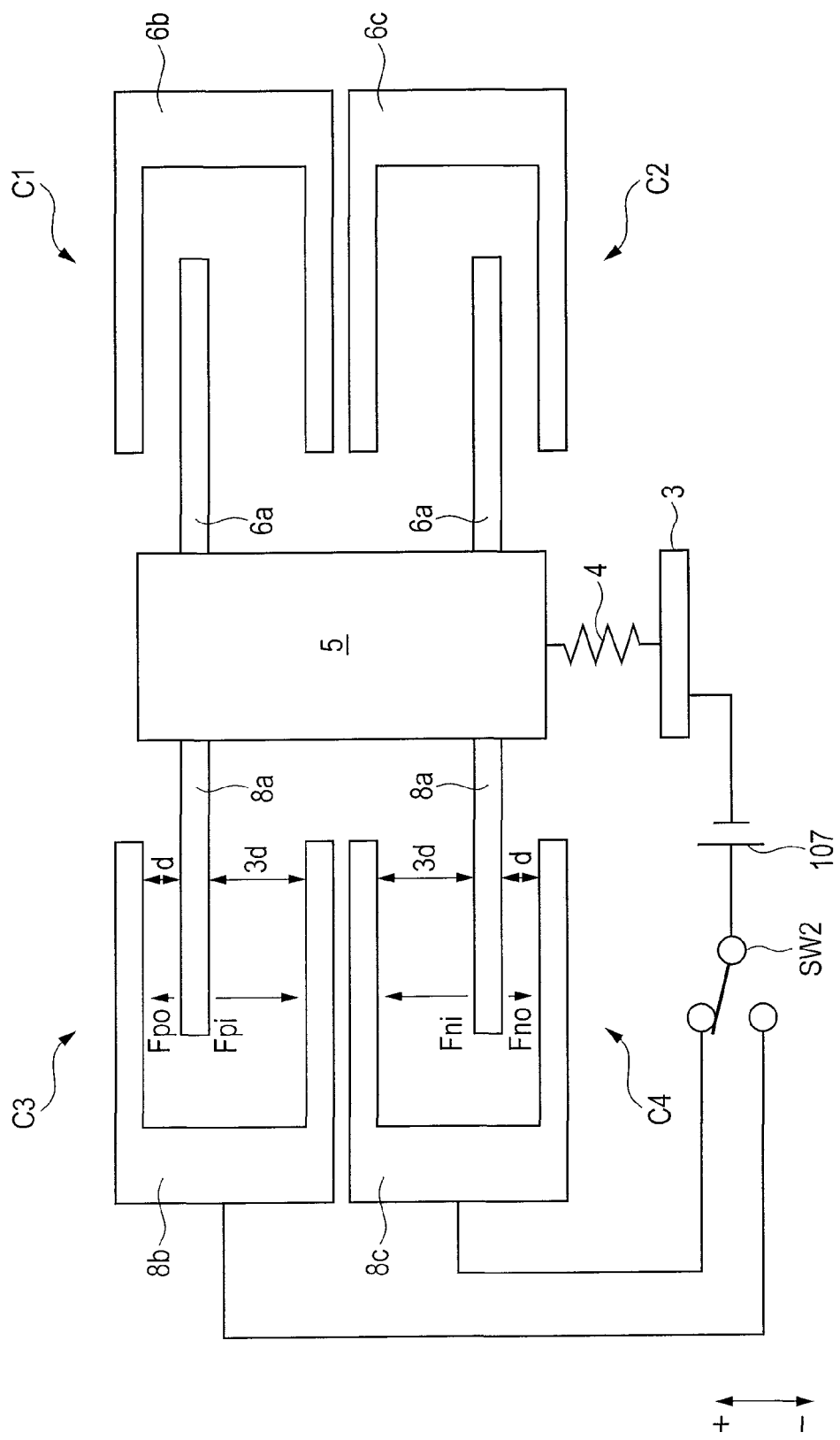
FIG. 14 is a diagram illustrating the structure of a capacitative element formed in a movable part.

Subsequently, a mechanism in which the capacitative element C3 and the capacitative element C4 of the parallel plate type have the nonlinear property will be described. FIG. 14 illustrates the structure of the capacitative element C1 to C4 formed in the movable part 5. The capacitative element C1 and the capacitative element C2 configure the capacitance detection unit, and the capacitative element C3 and the capacitative element C4 configure the forced displacement generation unit. In order to forcedly displace the movable part 5 by using the capacitative element C3 and the capacitative element C4 as in the sixth embodiment, an asymmetric electrode structure is required. In the sixth embodiment, the capacitative element C3 and the capacitative element C4, which configure the forced displacement generation unit, are of an electrode configuration of the parallel plate type, and formed to provide a gap ratio of 1:3 (d:3d). The reason is that, for example, when the capacitative element C3 is configured to provide the gap ratio of 1:1, an electrostatic force Fpo and an electrostatic force Fpi match each other so that the movable part 5 cannot be displaced.

The electrostatic force applied to the movable part 5 according to the diagnostic signal is represented by Expressions (1) to (3), and Expressions (4) to (6). Expressions (1) to (3) represent the electrostatic force that is applied to the capacitative element C3, and Expressions (4) to (6) represent the electrostatic force that is applied to the capacitative element C4.

$$Fpo = \tfrac{1}{2} \times \epsilon A/(d-y)^2 \times V\text{diag}^2 \quad (1)$$

$$Fpi = \tfrac{1}{2} \times \epsilon A/(3d+y)^2 \times V\text{diag}^2 \quad (2)$$

$$Fp = Fpo - Fpi \quad (3)$$

$$Fno = \tfrac{1}{2} \times \epsilon A/(d+y)^2 \times V\text{diag}^2 \quad (4)$$

$$Fni = \tfrac{1}{2} \times \epsilon A/(3d-y)^2 \times V\text{diag}^2 \quad (5)$$

$$Fn = Fno - Fni \quad (6)$$

where $\epsilon$ is the dielectric constant of air, A is an opposed area of the electrodes, d is a gap between the electrodes, y is the amount of displacement of the movable part 5 due to the zero-point offset, and Vdiag is a voltage of the diagnostic signal.

It is found through the above Expressions (1) to (6) that in the case of the electrode structure of the parallel plate type, because the zero-point offset affects y of the denominators in Expressions (1) to (6), the electrostatic force Fp and the electrostatic force Fn are nonlinearly changed when the zero-point offset is changed.

Further, the electrostatic force Fp and the electrostatic force Fn enable the outputs of the acceleration sensor at the time of the initial diagnosis as represented by Expression (7) to be obtained when the spring constant of the beams 4 in FIG. 14 is k, and the zero-point offset Goff is added thereto.

$$Gp = Fp/k + Goff, \; Gn = Fn/k + Goff \quad (7)$$

For the purpose of creating one index for determining whether there is a failure in the acceleration sensor, or not, by using the results of the above-mentioned Gp and Gn, a difference between Gp and Gn is taken to obtain Gspan represented by Expression (8).

$$\begin{aligned} Gspan &= Gp - Gn = Fp/k + Goff - (Fn/k + Goff) \\ &= Fp/k - Fn/k \end{aligned} \quad (8)$$

The above-mentioned graph of FIG. 12 shows the values of Gp, Gn, and Gspan in the case where the zero-point offsets of from 0 to ±0.8G are assumed by using Expressions (1) to (8). That is, when there is no abnormality (failure) in the acceleration sensor, the value of Gspan is larger than the value (3.05) of Gspan in the case where the zero-point offset Goff is 0 with respect to all of the zero-point offsets Goff. When this is criterion, it is possible to determine whether there is the abnormality in the acceleration sensor, or not.

For example, when the movable part 5 is fixed and not moved, or when a foreign particle is held between the electrodes that configure the capacitative element C1 to the capacitative element C4 to limit the displacement of the movable part 5, the value of Gspan becomes smaller than 3.05. As a result, it is possible to diagnose that the acceleration sensor is abnormal. Also, even when the electric leakage that affects the output of the acceleration sensor occurs in the capacitative element C1 to the capacitative element C4, because Gspan becomes 3.05 or lower, it is possible to diagnose that the acceleration sensor is abnormal. On the other hand, when the beams 4 of the acceleration sensor are damaged so that the movable part 5 is easily moved more than that in the normal state, because the value of Gspan exceeds the predetermined range, it is possible to diagnose that the acceleration sensor is abnormal. On the contrary, when the movable part 5 is displaced by the zero-point offset Goff, Gspan is larger than 3.05, and enters the predetermined range. Accordingly, it is found that the displacement abnormality caused by the abnormality of the acceleration sensor and the displacement caused by the zero-point offset can be separated from each other with a value (3.05) of Gspan in the case where the zero-point offset is 0 as a boundary. From the above-mentioned viewpoint, in the sixth embodiment, the predetermined range is set to Gspan, and only the case where Gspan is out of the predetermined range is diagnosed as the abnormality. As a result, the wrong diagnosis that a state in which the acceleration sensor is normal, and the zero-point offset occurs is abnormal can be suppressed.

As is understood from the graph of FIG. 12, the measurement range of the acceleration sensor needs to be widened according to the value of the assumed zero-point offset Goff. For example, in the acceleration sensor according to the sixth embodiment, the sensor output is in the measurement range of ±1.5G at a maximum. However, when it is assumed that the zero-point offset Goff is in the measurement range of ±0.8G, it is necessary to internally design the acceleration sensor so that the zero-point offset Goff can be measured up to about ±2.5G.

The invention made by the present inventors has been described in detail with reference to the various embodiments. However, the present invention is not limited to the above embodiments, but can be variously modified without departing from the subject matter of the invention.

The present invention can be mainly applied to the capacitance sensor represented by the acceleration sensor. In particular, the present invention can be widely applied to the capacitance sensor required in high reliability for the attitude control of automobiles or the attitude/operation control of a nursing-care robot.

What is claimed is:

1. A capacitance sensor comprising:
   (a) a substrate;
   (b) a cavity part that is formed in the substrate;
   (c) a fixed part that is formed within the cavity part;
   (d) an elastic deformation part that is formed within the cavity part and connected to the fixed part;
   (e) a movable part that is formed within the cavity part, and connected to the elastic deformation part;
   (f) a capacitance detection unit that includes a first capacitative element having a first fixed electrode formed within the cavity part, and a first movable electrode formed in the movable part so as to face each other, and outputs a capacitance change of the first capacitative element, which is developed by displacing the movable part;
   (g) a physical quantity calculation terminal that is connected to a physical quantity calculation section which finds a physical quantity of an external force on the basis of the capacitance change which is outputted from the capacitance detection unit;

(h) a forced oscillation generation unit that includes a second capacitative element having a second fixed electrode formed within the cavity part, and a second movable electrode formed in the movable part so as to face each other, and a diagnostic signal supply terminal for supplying a diagnostic signal between the second fixed electrode and the second movable electrode, and supplies the diagnostic signal to the diagnostic signal supply terminal to develop an electrostatic force between the second fixed electrode and the second movable electrode for generating forced oscillation; and (i) the physical quantity calculation terminal that is connected indirectly to an abnormality determination unit which determines whether there is an abnormality in the capacitance sensor, or not, on the basis of the forced oscillation generated in the forced oscillation generation unit, wherein the first capacitative element included in the capacitance detection unit and the second capacitative element included in the forced oscillation generation unit are separated from each other.

2. The capacitance sensor according to claim 1, further comprising:
(j) the physical quantity calculation unit that is connected to the physical quantity calculation terminal;
(k) a diagnostic signal generation unit that is connected to the diagnostic signal supply terminal and generates the diagnostic signal; and
(l) the abnormality determination unit that is connected indirectly to the physical quantity calculation terminal.

3. The capacitance sensor according to claim 2, further comprising:
(m) a modulated signal supply terminal for supplying a modulated signal to the movable part;
(n) a modulated signal generation unit that is connected to the modulated signal supply terminal and generates the modulated signal.

4. The capacitance sensor according to claim 3,
wherein the capacitance change of the first capacitative element includes a first capacitance change caused by the displacement of the movable part due to the external force, and a second capacitance change caused by the forced oscillation of the movable part due to the forced oscillation generation unit.

5. The capacitance sensor according to claim 4,
wherein an oscillation frequency caused by the forced oscillation of the movable part is higher than an external force response frequency based on the displacement of the movable part due to the external force, and lower than a carrier frequency of the modulated signal.

6. The capacitance sensor according to claim 5,
wherein the physical quantity calculation unit includes:
(j1) a voltage transforming unit that transforms the capacitance change output from the capacitance detection unit into a voltage signal;
(j2) a first synchronous detection unit that extracts a signal having a first specific band including the oscillation frequency and the external response frequency from the voltage signal output from the voltage transforming unit;
(j3) a first low-pass filter that extracts a signal having the external response frequency from the signal having the first specific band extracted by the first synchronous detection unit; and (j4) a calculation unit that calculates the physical quantity of the external force from the signal having the external response frequency that has passed through the first low-pass filter.

7. The capacitance sensor according to claim 6,
wherein the abnormality determination unit includes:
(l1) a second synchronous detection unit that inputs the signal having the first specific band extracted by the first synchronous detection unit, and extracts, from the input signal having the first specific band, a signal having a first detection frequency corresponding to the signal having the oscillation frequency, and a signal having a second detection frequency higher than the first detection frequency and corresponding to the signal having the oscillation frequency;
(l2) a second low-pass filter that allows the signal having the first detection frequency of the signal having the first detection frequency and the signal having the second detection frequency, which have been extracted by the second synchronous detection unit, to pass therethrough;
(l3) a comparison unit that compares the signal having the first detection frequency which has passed through the second low-pass filter with a predetermined value; and
(l4) a determination unit that determines whether there is an abnormality in the capacitance sensor, or not, on the basis of a result of the comparison unit.

8. The capacitance sensor according to claim 7,
wherein the abnormality determination unit further includes a first high-pass filter that inputs the signal having the first specific band, and allows a signal having a band higher than the external force response frequency among the input signal having the first specific band to pass therethrough, before the second synchronous detection unit.

9. The capacitance sensor according to claim 6,
wherein the abnormality determination unit includes:
(l1) a second synchronous detection unit that inputs the signal having the first specific band extracted by the first synchronous detection unit, and extracts, from the input signal having the first specific band, a signal having a first detection frequency corresponding to the signal having the oscillation frequency, and a signal having a second detection frequency higher than the first detection frequency and corresponding to the signal having the oscillation frequency;
(l2) a second high-pass filter that allows the signal having the second detection frequency of the signal having the first detection frequency and the signal having the second detection frequency, which have been extracted by the second synchronous detection unit, to pass therethrough;
(l3) a comparison unit that compares the signal having the second detection frequency which has passed through the second high-pass filter with a predetermined value; and
(l4) a determination unit that determines whether there is an abnormality in the capacitance sensor, or not, on the basis of a result of the comparison unit.

10. The capacitance sensor according to claim 9,
wherein the abnormality determination unit further includes a first high-pass filter that inputs the signal having the first specific band, and allows a signal having a band higher than the external force response frequency among the input signal having the first specific band to pass therethrough, before the second synchronous detection unit.

11. The capacitance sensor according to claim 7,
wherein a switch is disposed between the diagnostic signal generation unit and the diagnostic signal supply terminal,
wherein the abnormality determination unit periodically turns on/off the switch,
wherein the comparison unit further calculates a difference value between the signal having the first detection frequency in an on-state, and the signal having the first detection frequency in an off-state, and
wherein the determination unit further determines whether there is an abnormality in the capacitance sensor, or not, on the basis of the difference value.

12. The capacitance sensor according to claim 9,
wherein a switch is disposed between the diagnostic signal generation unit and the diagnostic signal supply terminal,
wherein the abnormality determination unit periodically turns on/off the switch,
wherein the comparison unit further calculates a difference value between the signal having the second detection frequency in an on-state, and the signal having the second detection frequency in an off-state, and
wherein the determination unit further determines whether there is an abnormality in the capacitance sensor, or not, on the basis of the difference value.

13. The capacitance sensor according to claim 5,
wherein the physical quantity of the external force is acceleration.

14. The capacitance sensor according to claim 13, further comprising: a structure that configures an angular sensor,
wherein the structure includes an oscillator that oscillates during operation, and a drive unit that oscillates the oscillator at a specific frequency.

15. The capacitance sensor according to claim 14,
wherein the oscillation frequency at which the movable part of the acceleration sensor is forcedly oscillated is a frequency which is 1/(the power of 2) of the specific frequency.

16. The capacitance sensor according to claim 14,
wherein a switch is disposed between the diagnostic signal generation unit and the diagnostic signal supply terminal, and
wherein the abnormality determination unit controls the on/off operation of the switch at a frequency which is 1/(the power of 2) of the specific frequency.

17. A capacitance sensor comprising:
(a) a substrate;
(b) a cavity part that is formed in the substrate;
(c) a fixed part that is formed within the cavity part;
(d) an elastic deformation part that is formed within the cavity part and connected to the fixed part;
(e) a movable part that is formed within the cavity part, and connected to the elastic deformation part;
(f) a capacitance detection unit that includes a first capacitative element having a first fixed electrode formed within the cavity part, and a first movable electrode formed in the movable part so as to face each other, and outputs a capacitance change of the first capacitative element, which is developed by displacing the movable part;
(g) a physical quantity calculation terminal that is connected to a physical quantity calculation section which finds a physical quantity of an external force on the basis of the capacitance change which is outputted from the capacitance detection unit;
(h) a forced displacement generation unit that includes a second capacitative element having a second fixed electrode formed within the cavity part, and a second movable electrode formed in the movable part so as to face each other, a first diagnostic signal supply terminal for supplying a first diagnostic signal between the second fixed electrode and the second movable electrode, and a second diagnostic signal supply terminal for supplying a second diagnostic signal between the second fixed electrode and the second movable electrode, and when operation starts, supplies the first diagnostic signal to the first diagnostic signal supply terminal to displace the movable part in a first direction, and supplies the second diagnostic signal to the second diagnostic signal supply terminal to displace the movable part in a second direction opposite to the first direction; and
(i) the physical quantity calculation terminal that is connected indirectly to an abnormality determination unit that determines whether there is an abnormality in the capacitance sensor, or not, on the basis of the forced displacement generated in the forced displacement generation unit,
wherein the first capacitative element included in the capacitance detection unit and the second capacitative element included in the forced displacement generation unit are separated from each other.

18. The capacitance sensor according to claim 17, further comprising:
(j) the physical quantity calculation unit that is connected to the physical quantity calculation terminal;
(k) a diagnostic signal generation unit that is connected to the first diagnostic signal supply terminal and generates one of the first diagnostic signal and the second diagnostic signal; and
(l) the abnormality determination unit that is connected indirectly to the physical quantity calculation terminal.

19. The capacitance sensor according to claim 18,
wherein the abnormality determination unit includes:
(l1) a memory unit that stores an initial offset value that is inputted from the physical quantity calculation unit at the time of starting operation, a first input value that is inputted from the physical quantity calculation unit when the movable part is displaced in the first direction by supplying the first diagnostic signal to the first diagnostic signal supply terminal, and a second input value that is inputted from the physical quantity calculation unit when the movable part is displaced in the second direction by supplying the second diagnostic signal to the second diagnostic signal supply terminal therein;
(l2) an operation unit that calculates a difference value between the first input value and the second input value which are stored in the memory unit;
(l3) a comparison unit that compares the difference value calculated in the operation unit with a predetermined range value; and
(l4) a determination unit that determines whether there is an abnormality in the capacitance sensor, or not, on the basis of a result of the comparison unit.

20. A capacitance sensor comprising:
(a) a substrate;
(b) a cavity part that is formed in the substrate;
(c) a fixed part that is formed within the cavity part;
(d) an elastic deformation part that is formed within the cavity part and connected to the fixed part;
(e) a movable part that is formed within the cavity part, and connected to the elastic deformation part;

(f) a capacitance detection unit that includes a first capacitative element having a first fixed electrode formed within the cavity part, and a first movable electrode formed in the movable part so as to face each other, and outputs a capacitance change of the first capacitative element, which is developed by displacing the movable part;
(g) a physical quantity calculation unit that finds a physical quantity of an external force on the basis of the capacitance change which is outputted from the capacitance detection unit;
(h) a forced oscillation generation unit that includes a second capacitative element having a second fixed electrode formed within the cavity part, and a second movable electrode formed in the movable part so as to face each other, and a diagnostic signal supply terminal for supplying a diagnostic signal between the second fixed electrode and the second movable electrode, and supplies the diagnostic signal to the diagnostic signal supply terminal to develop an electrostatic force between the second fixed electrode and the second movable electrode for generating forced oscillation; and
(i) an abnormality determination unit that determines whether there is an abnormality in the capacitance sensor, or not, on the basis of the forced oscillation generated in the forced oscillation generation unit,
wherein the first capacitative element included in the capacitance detection unit and the second capacitative element included in the forced oscillation generation unit are separated from each other.

21. A capacitance sensor comprising:
(a) a substrate;
(b) a cavity part that is formed in the substrate;
(c) a fixed part that is formed within the cavity part;
(d) an elastic deformation part that is formed within the cavity part and connected to the fixed part;
(e) a movable part that is formed within the cavity part, and connected to the elastic deformation part;
(f) a capacitance detection unit that includes a first capacitative element having a first fixed electrode formed within the cavity part, and a first movable electrode formed in the movable part so as to face each other, and outputs a capacitance change of the first capacitative element, which is developed by displacing the movable part;
(g) a physical quantity calculation terminal that finds a physical quantity of an external force on the basis of the capacitance change which is outputted from the capacitance detection unit;
(h) a forced displacement generation unit that includes a second capacitative element having a second fixed electrode formed within the cavity part, and a second movable electrode formed in the movable part so as to face each other, a first diagnostic signal supply terminal for supplying a first diagnostic signal between the second fixed electrode and the second movable electrode, and a second diagnostic signal supply terminal for supplying a second diagnostic signal between the second fixed electrode and the second movable electrode, and when operation starts, supplies the first diagnostic signal to the first diagnostic signal supply terminal to displace the movable part in a first direction, and supplies the second diagnostic signal to the second diagnostic signal supply terminal to displace the movable part in a second direction opposite to the first direction; and
(i) an abnormality determination unit that determines whether there is an abnormality in the capacitance sensor, or not, on the basis of the forced displacement generated in the forced displacement generation unit,
wherein the first capacitative element included in the capacitance detection unit and the second capacitative element included in the forced displacement generation unit are separated from each other.

* * * * *